(12) United States Patent
Meng et al.

(10) Patent No.: US 12,436,797 B2
(45) Date of Patent: Oct. 7, 2025

(54) DATA DELAY DETECTION METHOD AND APPARATUS, ELECTRONIC DEVICE, AND COMPUTER-READABLE MEDIUM

(71) Applicant: Beijing Volcano Engine Technology Co., Ltd., Beijing (CN)

(72) Inventors: He Meng, Beijing (CN); Huarui Zhang, Beijing (CN); Jia Min, Beijing (CN); Zhou Li, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/967,974

(22) Filed: Dec. 4, 2024

(65) Prior Publication Data

US 2025/0199845 A1    Jun. 19, 2025

(30) Foreign Application Priority Data

Dec. 19, 2023  (CN) .......................... 202311753198.6

(51) Int. Cl.
*G06F 9/44*  (2018.01)
*G06F 9/46*  (2006.01)

(52) U.S. Cl.
CPC .................................. *G06F 9/466* (2013.01)

(58) Field of Classification Search
CPC ...................................................... G06F 9/466
USPC .......................................................... 718/102
See application file for complete search history.

(56) References Cited

U.S. PATENT DOCUMENTS

| 2011/0161939 | A1* | 6/2011 | Demiya | G06F 11/3612 717/132 |
| 2022/0091883 | A1* | 3/2022 | Gadre | G06N 20/00 |

FOREIGN PATENT DOCUMENTS

| CN | 107025224 A | 8/2017 |
| CN | 111934793 A | 11/2020 |
| CN | 112328377 B | 4/2022 |

* cited by examiner

*Primary Examiner* — Timothy A Mudrick
(74) *Attorney, Agent, or Firm* — Alleman Hall & Tuttle LLP

(57) ABSTRACT

Provided are a data delay detection method and apparatus, an electronic device, and a computer-readable medium. The method includes: first, obtaining a baseline construction parameter; then, constructing a baseline instance according to the baseline construction parameter; then, obtaining a data delay detection result of each real-time task; and finally, determining delay state characterization data of the baseline instance according to the data delay detection results of the at least two real-time tasks, so that the delay state characterization data can better represent a data delay of a full-link task used to process the real-time data stream.

18 Claims, 5 Drawing Sheets

DATA DELAY DETECTION METHOD AND APPARATUS, ELECTRONIC DEVICE, AND COMPUTER-READABLE MEDIUM

CROSS-REFERENCE TO RELATED APPLICATION

For all purposes, the present application claims the priority of the Chinese patent application No. 202311753198.6 filed on Dec. 19, 2023, the entire disclosure of which is incorporated herein by reference as part of the present application.

TECHNICAL FIELD

The present application relates to the field of data processing technologies, and in particular, to a data delay detection method and apparatus, an electronic device, and a computer-readable medium.

BACKGROUND

For some application scenarios, for example, scenarios with high data timeliness requirements, these scenarios may have the following requirements: a real-time data stream is processed by using a plurality of real-time tasks, to meet data timeliness requirements of these scenarios. The real-time task refers to a task involved in a real-time data stream processing process. There is a preset specific relationship between the plurality of real-time tasks. For example, when the plurality of real-time tasks include a task 1, a task 2, and a task 3, if the task 1 needs to process data produced by the task 2, and the task 3 needs to process data produced by the task 1, a relationship between the plurality of real-time tasks may be specifically as follows: the task 2 is an upstream task of the task 1, the task 1 is a downstream task of the task 2, the task 1 is an upstream task of the task 3, and the task 3 is a downstream task of the task 1.

In addition, for the plurality of real-time tasks, because the plurality of real-time tasks are used to process the real-time data stream, the plurality of real-time tasks have relatively high requirements on data delay. Therefore, how to determine a data delay of the plurality of real-time tasks becomes a technical problem to be solved urgently.

SUMMARY

To solve the above technical problems, the present application provides a data delay detection method and apparatus, an electronic device, and a computer-readable medium.

To achieve the above objective, the technical solutions provided by the present application are as follows.

The present application provides a data delay detection method, the method includes:
obtaining a baseline construction parameter;
constructing a baseline instance according to the baseline construction parameter; the baseline instance including a task link graph and a node parameter of each node in the task link graph; the task link graph being used to describe a data dependency relationship between at least two real-time tasks; different nodes in the task link graph being used to represent different real-time tasks; and the at least two real-time tasks are used to process a real-time data stream;
obtaining a data delay detection result of each real-time task; and
determining delay state characterization data of the baseline instance according to the data delay detection results of the at least two real-time tasks.

In a possible implementation, the baseline construction parameter includes a task identifier of a baseline guarantee task, a baseline commitment delay, a baseline early warning delay, and a task delay gain coefficient; and
the constructing a baseline instance according to the baseline construction parameter includes:
determining the at least two real-time tasks and the data dependency relationship between the at least two real-time tasks according to a pre-constructed task link relationship and the task identifier of the baseline guarantee task, the task link relationship including the data dependency relationship between the at least two real-time tasks, the at least two real-time tasks including the baseline guarantee task and a task that directly or indirectly provides data for the baseline guarantee task; and
constructing the baseline instance according to the at least two real-time tasks, the data dependency relationship between the at least two real-time tasks, the baseline commitment delay, the baseline early warning delay, and the task delay gain coefficient.

In a possible implementation, the constructing the baseline instance includes:
constructing, in the task link graph, a node corresponding to the baseline guarantee task, and determining a node parameter of the node corresponding to the baseline guarantee task according to the baseline commitment delay and the baseline early warning delay;
determining, according to the data dependency relationship between the at least two real-time tasks, an upstream task of a target task from the at least two real-time tasks, an initial value of the target task being the baseline guarantee task, and the data dependency relationship between the at least two real-time tasks including a data dependency relationship between the target task and the upstream task;
constructing, in the task link graph, a node corresponding to the upstream task, constructing a connection relationship between the node corresponding to the upstream task and the node corresponding to the target task in the task link graph, and determining a node parameter of the node corresponding to the upstream task according to the task delay gain coefficient and the node parameter of the node corresponding to the target task; and
updating a traversal description state of the node corresponding to the target task to a traversed state, updating the target task with a task corresponding to a node in an untraversed state in the task link graph, and continuing to perform the operation of determining, according to the data dependency relationship between the at least two real-time tasks, an upstream task of a target task from the at least two real-time tasks, until all nodes in the task link graph are in the traversed state.

In a possible implementation, after the determining, from the at least two real-time tasks, an upstream task of a target task, the method further includes:
determining whether there is a node corresponding to the upstream task in the task link graph; and
if there is the node corresponding to the upstream task in the task link graph, constructing, in the task link graph, a connection relationship between the node corresponding to the upstream task and the node corresponding to the target task, and updating a node parameter of the node corresponding to the upstream task according to the task delay gain coefficient and the node parameter of the node corresponding to the target task; and the constructing, in the task link graph, a node corresponding to the upstream task includes:

if there is no node corresponding to the upstream task in the task link graph, constructing, in the task link graph, the node corresponding to the upstream task.

In a possible implementation, the node parameter includes a task delay constraint; a task delay constraint of the node corresponding to the baseline guarantee task includes the baseline commitment delay and the baseline early warning delay; and a task delay constraint of the node corresponding to the upstream task is determined according to a product of the task delay gain coefficient and a task delay constraint of the node corresponding to the target task.

In a possible implementation, the node parameter includes a task hierarchy; a task hierarchy of the node corresponding to the baseline guarantee task is a preset hierarchy; and a task hierarchy of the node corresponding to the upstream task is determined according to a sum of a preset hierarchy step and a task hierarchy of the node corresponding to the target task.

In a possible implementation, the node parameter includes a task hierarchy;

nodes in an untraversed state in the task link graph include at least one candidate node; and the updating the target task with a task corresponding to a node in an untraversed state in the task link graph includes:

selecting a to-be-used node from the at least one candidate node according to a task hierarchy of each candidate node, a task hierarchy of the to-be-used node being not higher than a task hierarchy of another node other than the to-be-used node in the at least one candidate node; and updating the target task with the task corresponding to the to-be-used node.

In a possible implementation, the node parameter of the node corresponding to the upstream task includes an impact task identifier; if the target task is the baseline guarantee task, the impact task identifier of the node corresponding to the upstream task is determined according to the task identifier of the target task; or if the target task is not the baseline guarantee task, the impact task identifier of the node corresponding to the upstream task is determined according to the impact task identifier of the node corresponding to the target task.

In a possible implementation, the node parameter includes a task delay constraint; and the determining delay state characterization data of the baseline instance according to the data delay detection results of the at least two real-time tasks includes:

determining the delay state characterization data of the baseline instance according to the data delay detection results of the at least two real-time tasks and the task delay constraint of each node in the task link graph.

In a possible implementation, the at least two real-time tasks include at least one baseline guarantee task; the delay state characterization data includes a baseline state; and the determining a baseline state includes:

for any baseline guarantee task, determining a data delay state corresponding to the baseline guarantee task according to a comparison result between a data delay detection result of the baseline guarantee task and a task delay constraint of a node used to represent the baseline guarantee task; and selecting a target state from data delay states corresponding to the at least one baseline guarantee task according to a state level of each data delay state corresponding to the baseline guarantee task, and using the target state as the baseline state, a state level of the target state being not lower than a state level of another data delay state other than the target state in the data delay states corresponding to the at least one baseline guarantee task.

In a possible implementation, the at least two real-time tasks include a baseline guarantee task and at least one first task, there is a direct or indirect data dependency relationship between the baseline guarantee task and each first task, the task link graph includes a path corresponding to the baseline guarantee task, the path includes a node used to represent the baseline guarantee task and a node used to represent each first task, and a start point of the path is the node used to represent the baseline guarantee task; the node parameter includes a task hierarchy; the delay state characterization data includes a baseline event; and a trigger process of the baseline event includes:

determining a target node from nodes in the path other than the start point and in an untraversed state, a task hierarchy of the target node being not higher than a task hierarchy of another node other than the target node in the nodes in the untraversed state;

if a data delay detection result of a task represented by the target node exceeds a task delay constraint of the target node, and it is determined that there is no node that has triggered the baseline event in the path, triggering a baseline event corresponding to the target node; or if the data delay detection result of the task represented by the target node does not exceed the task delay constraint of the target node, updating a traversal description state of the target node to a traversed state, and continuing to perform the operation of determining a target node from nodes in the path other than the start point and in an untraversed state.

In a possible implementation, the triggering a baseline event corresponding to the target node includes:

if it is determined that there is no baseline event corresponding to the target node, creating the baseline event corresponding to the target node; or if it is determined that there is the baseline event corresponding to the target node, updating a duration parameter of the baseline event corresponding to the target node.

In a possible implementation, the method further includes:

if the data delay detection result of the task represented by the target node does not exceed the task delay constraint of the target node, there is the baseline event corresponding to the target node, and an event state of the baseline event corresponding to the target node is a first state value, updating the event state of the baseline event corresponding to the target node from the first state value to a second state value.

In a possible implementation, the node parameter includes a task delay constraint; the at least two real-time tasks include at least one baseline guarantee task and at least one second task, a task delay constraint of a node used to represent the baseline guarantee task includes a baseline commitment delay and a baseline early warning delay, for any second task, there is a direct or indirect data dependency relationship between the second task and one or more baseline guarantee tasks; and the method further includes:

generating alarm information according to the data delay detection results of the at least two real-time tasks and the task delay constraint of each node in the task link graph, the alarm information including one or more of a baseline early warning alarm instance, a baseline breaking alarm instance, and a baseline event alarm instance, data delay detection results of the baseline guarantee tasks described in the baseline early warning alarm instance being all lower than the baseline commitment delay, and the data delay detection results of the baseline guarantee tasks described in the baseline early warning alarm instance all exceeding the baseline early warning delay, data delay detection results of the baseline guarantee tasks described in the baseline breaking alarm instance all exceeding the baseline commitment delay, and the baseline event alarm instance being generated according to a baseline event triggered by one or more second tasks, and for any second task used to trigger the baseline event, a data delay detection result of the second task exceeding a task delay constraint of a node used to represent the second task.

In a possible implementation, the method further includes:

constructing a delay analysis graph according to the task link graph and the data delay detection results of the at least two real-time tasks; and displaying the delay analysis graph.

In a possible implementation, the method is applied to a client; and the obtaining a baseline construction parameter includes:

receiving a baseline construction request, the baseline construction request carrying the baseline construction parameter.

The present application provides a data delay detection apparatus, including:

a first obtaining unit, configured to obtain a baseline construction parameter;

a baseline construction unit, configured to construct a baseline instance according to the baseline construction parameter, the baseline instance including a task link graph and a node parameter of each node in the task link graph, the task link graph being used to describe a data dependency relationship between at least two real-time tasks, different nodes in the task link graph being used to represent different real-time tasks, and the at least two real-time tasks being used to process a real-time data stream;

a second obtaining unit, configured to obtain a data delay detection result of each real-time task; and a data determining unit, configured to determine delay state characterization data of the baseline instance according to the data delay detection results of the at least two real-time tasks.

The present application provides an electronic device, including: a processor and a memory;

the memory is configured to store an instruction or a computer program; and the processor is configured to execute the instruction or the computer program in the memory, to enable the electronic device to perform the data delay detection method provided in the present application.

The present application provides a computer-readable medium, an instruction or a computer program is stored in the computer-readable medium, and when the instruction or the computer program runs on a device, the device is enabled to perform the data delay detection method provided in the present application.

The present application provides a computer program product, including a computer program carried on a non-transitory computer-readable medium, the computer program includes program code for performing the data delay detection method provided in the present application.

Compared with the related art, the present application has at least the following advantages:

in the technical solution provided in the present application, a baseline construction parameter is first obtained; then, a baseline instance is constructed according to the baseline construction parameter, so that the baseline instance includes a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream; then, a data delay detection result of each real-time task is obtained; and finally, delay state characterization data of the baseline instance is determined according to the data delay detection results of the at least two real-time tasks, so that the delay state characterization data can better represent a data delay of a full-link task used to process the real-time data stream. In this way, the data delay of the full-link task can be obtained at the same time, thereby effectively avoiding defects caused by obtaining only a data delay of a single task (for example, a full-link data delay cannot be perceived, and a main cause of a delay alarm cannot be quickly found). This is beneficial to improving a data delay obtaining effect in a real-time data stream processing scenario.

BRIEF DESCRIPTION OF DRAWINGS

To make the objectives, technical solutions, and advantages of the embodiments of the present application clearer, the following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

DETAILED DESCRIPTION

Figure 1:
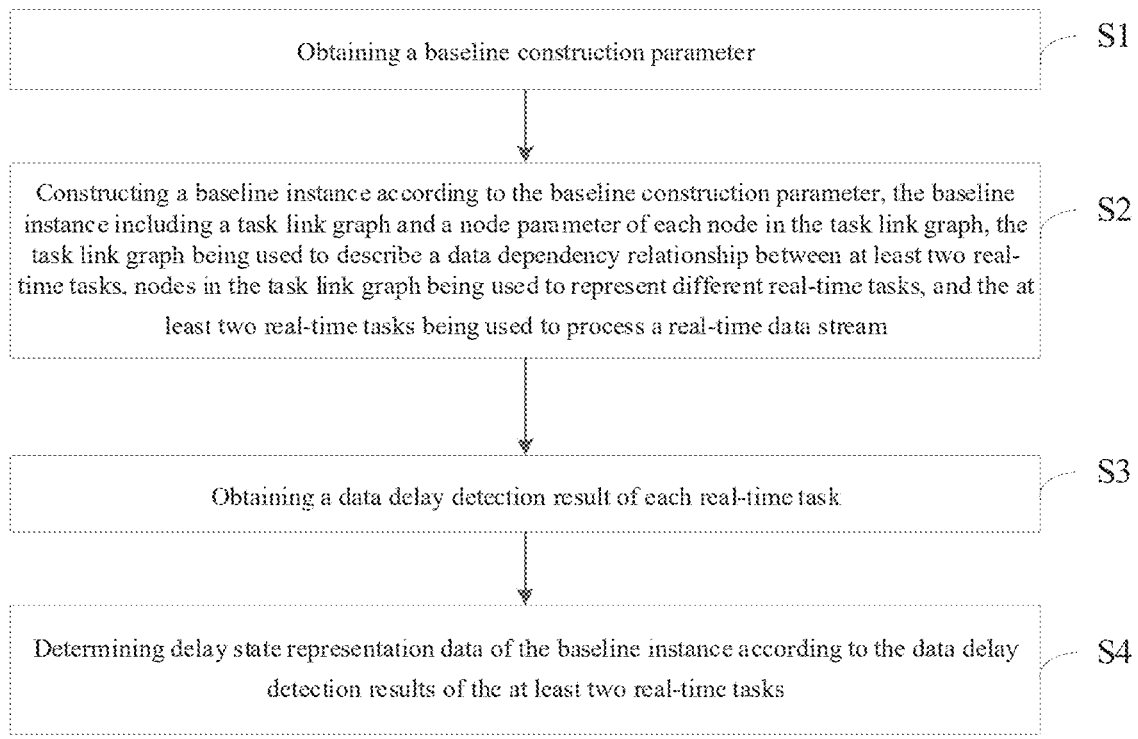
FIG. 1 is a flowchart of a data delay detection method according to an embodiment of the present application.

To facilitate understanding of the technical solutions of the present application, some technical terms are explained below.

A real-time data stream refers to a data stream with relatively high timeliness requirements, so that a related process of the real-time data stream pays more attention to an indicator of data delay.

A service level agreement (SLA) is used to describe some services, for example, a data delay constraint that needs to be followed by a related data service of a real-time data stream.

A real-time baseline is a full-link of real-time data stream tasks based on a data dependency relationship, and may be referred to as a baseline for short.

A task delay refers to a current delay time of data produced by a real-time task, and the task delay of the real-time task=data write-in time−data generation time.

A baseline guarantee task is a task set for which a user has a same SLA requirement for data production delay, and for any baseline guarantee task, the baseline guarantee task may perform corresponding processing according to data produced by some other tasks, to obtain data produced by the baseline guarantee task.

A baseline commitment delay is a parameter set by a user for one or more baseline guarantee tasks and used to describe a maximum data delay time, so that when a task delay of one or more baseline guarantee tasks is greater than the baseline commitment delay, a baseline breaking alarm is triggered.

A baseline early warning delay is a parameter set by a user for one or more baseline guarantee tasks and used to describe an amount of early data delay discovery, so that when a task delay of one or more baseline guarantee tasks is greater than the baseline early warning delay, a baseline early warning alarm is triggered.

A task link graph is a complete task dependency link graph from a baseline guarantee task upward, so that the task link graph can describe data that needs to be followed by each baseline guarantee task to perform corresponding processing.

A task delay gain coefficient is a parameter that needs to be followed when a task commitment delay and/or a task early warning delay of an upstream task of a specific task are calculated, so that an abnormal upstream task can be quickly found based on the task delay gain coefficient. For any task, the task is used to perform corresponding processing according to data provided by the upstream task of the task.

A task commitment delay is a parameter determined for a specific task and used to describe a maximum data delay time; and the task commitment delay=the task delay gain coefficient×a commitment delay of a downstream task of the specific task. The downstream task of the specific task is used to perform corresponding data processing according to data provided by the specific task.

Baseline breaking indicates that a task delay of at least one baseline guarantee task is greater than a baseline commitment delay.

Baseline early warning indicates that a task delay of at least one baseline guarantee task is greater than a baseline early warning delay, but all are less than a baseline commitment delay.

A baseline event indicates that a task delay of one or more upstream tasks is greater than a task commitment delay.

A baseline state is used to describe a state of a baseline; and the baseline state may include three states: security, early warning, and breaking. The state "security" indicates that a task delay of all baseline guarantee tasks involved in the baseline is less than the baseline early warning delay. The state "early warning" indicates that a task delay of one or more baseline guarantee tasks in the baseline is greater than the baseline early warning delay, but all are less than the baseline commitment delay. The state "breaking" indicates that a task delay of at least one baseline guarantee task in the baseline is greater than the baseline commitment delay.

To make persons skilled in the art better understand the solutions of the present application, the following clearly and completely describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

To better understand the technical solution provided in the present application, the following first describes a data delay detection method provided in the present application with reference to some accompanying drawings. As shown in FIG. 1, the data delay detection method provided in this embodiment of the present application includes the following S1 to S4. FIG. 1 is a flowchart of a data delay detection method according to an embodiment of the present application.

S1: obtaining a baseline construction parameter.

The baseline construction parameter refers to a parameter that needs to be followed when a real-time baseline is constructed.

In addition, the present application does not limit the baseline construction parameter. For example, in some application scenarios, the baseline construction parameter may include at least one of a task identifier of a baseline guarantee task, a baseline commitment delay, a baseline early warning delay, and a task delay gain coefficient. For ease of understanding, these parameters are separately described below.

The task identifier of the baseline guarantee task is used to uniquely identify the baseline guarantee task, so that the task identifier can represent a baseline guarantee task specified for a real-time baseline; and the present application does not limit an implementation of the task identifier of the baseline guarantee task. For example, the task identifier of the baseline guarantee task may be implemented by using any existing or future information that can uniquely identify a task, such as an identity document (ID) of the baseline guarantee task or a task name of the baseline guarantee task.

The baseline commitment delay is used to represent a maximum data delay time set for all baseline guarantee tasks in a real-time baseline. For example, the baseline commitment delay may be implemented by using a baseline commitment delay shown in FIG. 2, a baseline commitment delay shown in FIG. 3, or a baseline commitment delay shown in FIG. 4.

The baseline early warning delay is used to represent an amount of early data delay discovery set for all baseline guarantee tasks in a real-time baseline, and the baseline early warning delay is less than the baseline commitment delay. For example, the baseline early warning delay may be implemented by using a baseline early warning delay shown in FIG. 2, a baseline early warning delay shown in FIG. 3, or a baseline early warning delay shown in FIG. 4.

The task delay gain coefficient is used to represent a parameter that needs to be followed when a data delay constraint, such as a task commitment delay and/or a task early warning delay, of an upstream task of any task is calculated for a real-time baseline. For example, the task delay gain coefficient may be implemented by using a task delay gain coefficient shown in FIG. 2, a task delay gain coefficient shown in FIG. 3, or a task delay gain coefficient shown in FIG. 4.

In addition, the present application does not limit a manner of obtaining the baseline construction parameter. For example, in some application scenarios, the baseline construction parameter may be a default parameter read from a preset storage space.

For another example, in some application scenarios, to better meet real-time baseline construction requirements of some users, the present application further provides a possible implementation of S1. In this implementation, when the data delay detection method provided in the present application is applied to a client, S1 may specifically be: receiving a baseline construction request; the baseline construction request carries the baseline construction parameter. The client is configured to provide a baseline-related interactive service for the user; and the present application does not limit an implementation of the client. For example, the client may be implemented by using an application (APP) or a web page. The baseline construction request is a request triggered by the user on the client and used to request to construct a real-time baseline; and the baseline construction request carries a baseline construction parameter that needs to be followed when the real-time baseline is constructed. In addition, the present application does not limit a trigger manner of the baseline construction request.

Figure 2:
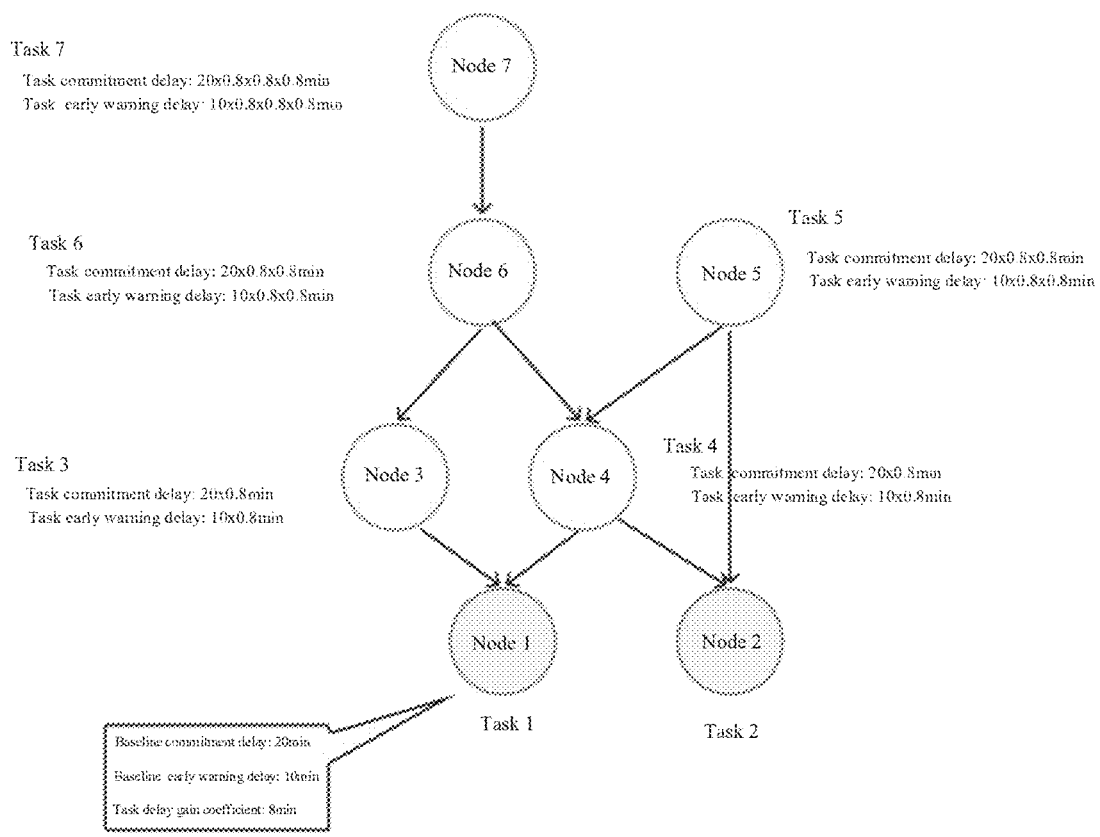
FIG. 2 is a schematic diagram of a baseline instance according to an embodiment of the present application.
Figure 3:
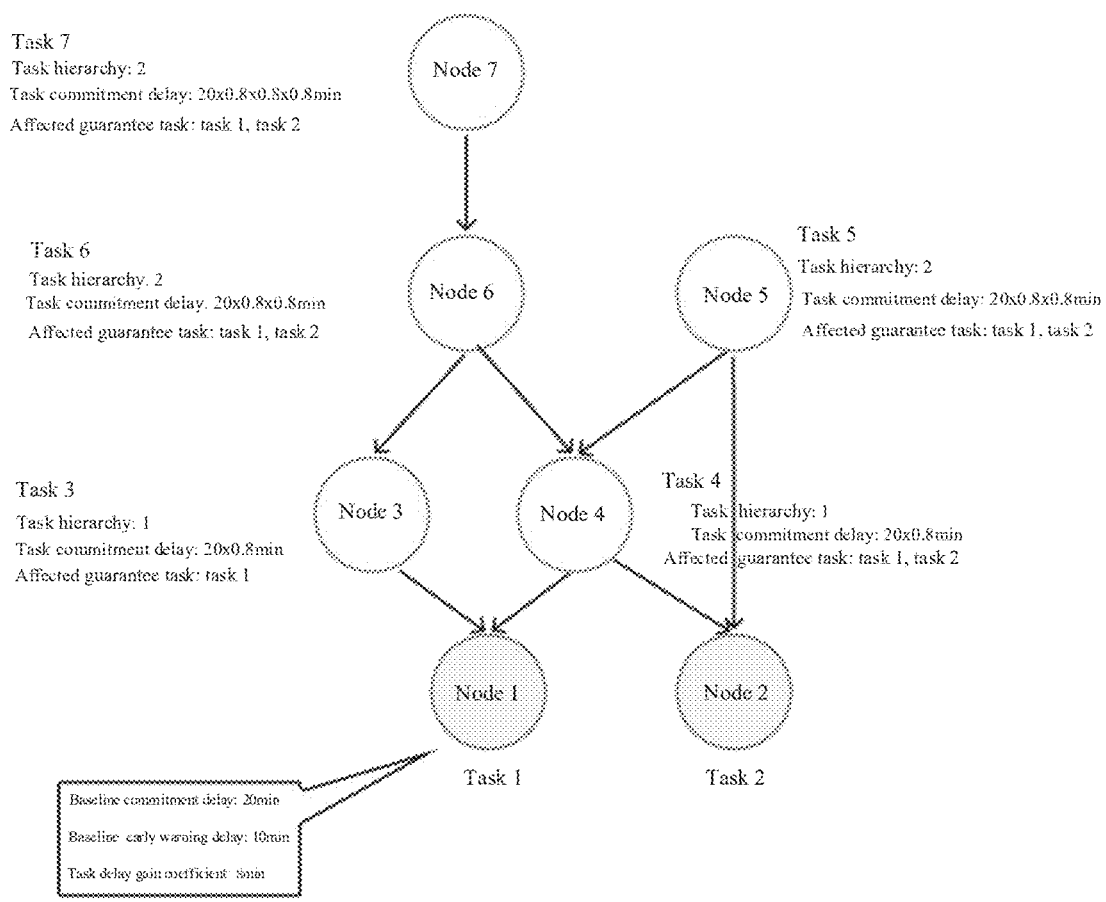
FIG. 3 is a schematic diagram of another baseline instance according to an embodiment of the present application.
Figure 4:
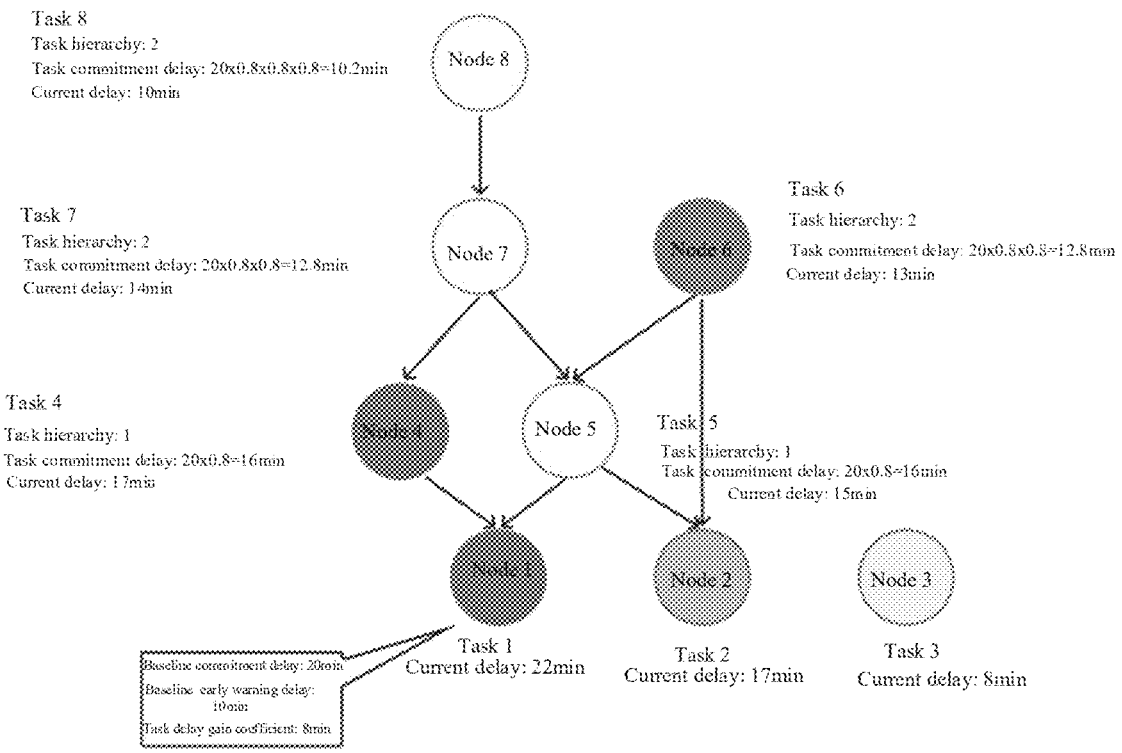
FIG. 4 is a schematic diagram of still another baseline instance according to an embodiment of the present application.

It can be learned from the related content of S1 that in some application scenarios, if a user wants to construct a real-time baseline, the user may trigger a baseline construction request on a client used by the user, so that the baseline construction request carries a baseline construction parameter set by the user, so that the baseline construction parameter can describe a real-time baseline construction requirement of the user, so that a real-time baseline that meets the requirement of the user can be constructed based on the baseline construction parameter, for example, a baseline instance shown in FIG. 2, a baseline instance shown in FIG. 3, or a baseline instance shown in FIG. 4.

S2: constructing a baseline instance according to the baseline construction parameter; the baseline instance includes a task link graph and a node parameter of each node in the task link graph; the task link graph is used to describe a data dependency relationship between at least two real-time tasks; different nodes in the task link graph are used to represent different real-time tasks; and the at least two real-time tasks are used to process a real-time data stream.

The baseline instance refers to a real-time baseline constructed according to the baseline construction parameter, so that a full-link task of the real-time data stream can be described by the baseline instance. For example, the baseline instance may be implemented by using a baseline instance shown in FIG. 2, a baseline instance shown in FIG. 3, a baseline instance shown in FIG. 4, or a baseline instance shown in FIG. 5.

In addition, for the baseline instance, the baseline instance may include the task link graph and the node parameter of each node in the task link graph. The task link graph is used to describe the data dependency relationship between the at least two real-time tasks. The at least two real-time tasks refer to tasks involved in the baseline instance, and the at least two real-time tasks are used to process the real-time data stream. In addition, the present application does not limit an implementation of the at least two real-time tasks. For example, when the baseline construction parameter includes a task identifier of at least one baseline guarantee task, the at least two real-time tasks may include the at least one baseline guarantee task and a task that directly or indirectly provides data for each baseline guarantee task. To facilitate understanding of the task link graph, the following uses an example for description.

For example, as shown in FIG. 2, if the baseline construction parameter includes a task identifier of a task 1 and a task identifier of a task 2, the task link graph may be implemented by using the task link graph shown in FIG. 2, so that the task link graph is used to describe a data dependency relationship between the task 1 to the task 7, so that the task link graph can represent information such as that the task 1 needs to perform corresponding processing according to data produced by a task 3 and data produced by a task 4, the task 2 needs to perform corresponding processing according to data produced by the task 4 and data produced by a task 5, the task 3 needs to perform corresponding processing according to data produced by a task 6, the task 4 needs to perform corresponding processing according to data produced by the task 6 and data produced by the task 5, and the task 6 needs to perform corresponding processing according to data produced by a task 7. Based on this, it can be learned that in a possible implementation, the at least two real-time tasks described by the task link graph may include the task 1 to the task 7 shown in FIG. 2.

In addition, for the task link graph, the task link graph may include at least one node, and different nodes in the task link graph are used to represent different real-time tasks. For example, when the task link graph is the task link graph shown in FIG. 2 or the task link graph shown in FIG. 3, the task link graph may include a node 1 to a node 7, where the node 1 is used to represent the task 1, the node 2 is used to represent the task 2, . . . and so on.

In addition, the present application does not limit a storage manner of the task link graph. For example, in some application scenarios, to better save storage space, the task link graph is stored in a key-value pair manner of <childId, List<parentId>>. The childId represents a task identifier of a task, the List<parentId> is a list, and the list records task identifiers of all upstream tasks that directly provide data for the task.

Furthermore, for the baseline instance, the baseline instance includes not only the task link graph, but also the node parameter of each node in the task link graph, so that the baseline instance can represent not only what a full-link task of the real-time data stream is, but also a related parameter of the full-link task, for example, a parameter such as a data delay constraint. A node parameter of an $n^{th}$ node is used to describe an attribute of the $n^{th}$ node, so that the node parameter of the $n^{th}$ node is used to represent a state presented by a task represented by the $n^{th}$ node in a real-time baseline; and the present application does not limit an implementation of the node parameter of the $n^{th}$ node. For example, the node parameter of the $n^{th}$ node may include one or more of a task identifier of the $n^{th}$ node, a task delay constraint of the $n^{th}$ node, a task hierarchy of the $n^{th}$ node, and an impact task identifier of the $n^{th}$ node. Where n is a positive integer, $n \leq N$, N is a positive integer, and N represents the number of all nodes in the task link graph.

The task identifier of the $n^{th}$ node is used to uniquely identify the task represented by the $n^{th}$ node; and the present application does not limit an implementation of the task identifier of the $n^{th}$ node. For example, when the $n^{th}$ node represents a task n, the task identifier of the $n^{th}$ node may be implemented by using a task ID of the task n.

The task delay constraint of the $n^{th}$ node is used to describe a data delay constraint that needs to be met by the task represented by the $n^{th}$ node; and the present application does not limit an implementation of the task delay constraint of the $n^{th}$ node. For example, the task delay constraint may include a commitment delay constraint and an early warning delay constraint. The commitment delay constraint is used to describe a maximum data delay time that needs to be met by the task represented by the $n^{th}$ node. The early warning delay constraint is used to describe an amount of early data delay discovery that needs to be met by the task represented by the $n^{th}$ node.

The task hierarchy of the $n^{th}$ node is used to describe which layer the $n^{th}$ node is located at in the above task link graph, so that the task hierarchy of the $n^{th}$ node can represent a distance presented on a data transmission link between a task represented by the $n^{th}$ node and a corresponding baseline guarantee task.

The impact task identifier of the $n^{th}$ node is used to describe which baseline guarantee task is affected when a data delay occurs at the $n^{th}$ node.

Furthermore, the present application does not limit an implementation of S2. For case of understanding, the following uses an example for description.

For example, when the baseline construction parameter includes the task identifier of the baseline guarantee task, the baseline commitment delay, the baseline early warning delay, and the task delay gain coefficient, S2 may specifically include the following steps 11 to 12.

Step 11: determining the at least two real-time tasks and the data dependency relationship between the at least two real-time tasks according to a pre-constructed task link relationship and the task identifier of the baseline guarantee task; the task link relationship includes the data dependency relationship between the at least two real-time tasks, and the at least two real-time tasks include the baseline guarantee task and a task that directly or indirectly provides data for the baseline guarantee task.

The task link relationship is used to describe a data dependency relationship between some tasks, and the task link relationship is pre-constructed according to an actual application scenario. For example, the task link relationship may include at least a data dependency relationship shown in FIG. 2 or FIG. 3. In addition, the present application does not limit an implementation of the task link relationship. In addition, the task link relationship may be pre-constructed according to an actual application scenario.

It can be learned from the related content of step 11 that after the task identifier of the baseline guarantee task is obtained, a task that directly or indirectly provides data for the baseline guarantee task may be found from the pre-constructed task link relationship, to obtain the at least two real-time tasks and the data dependency relationship between the at least two real-time tasks, so that the at least two real-time tasks include the baseline guarantee task and the task that directly or indirectly provides data for the baseline guarantee task, and the data dependency relationship between the at least two real-time tasks represents a data dependency between these real-time tasks. It should be noted that the present application does not limit an implementation of the finding process.

Step 12: constructing the baseline instance according to the at least two real-time tasks, the data dependency relationship between the at least two real-time tasks, the baseline commitment delay, the baseline early warning delay, and the task delay gain coefficient.

In the present application, after the at least two real-time tasks and the data dependency relationship between the at least two real-time tasks are obtained, the baseline instance may be constructed according to the at least two real-time tasks, the data dependency relationship between the at least two real-time tasks, the baseline commitment delay, the baseline early warning delay, and the task delay gain coefficient, so that the baseline instance can present, in a link graph manner, a data dependency relationship between different real-time tasks and a state presented by each real-time task in the real-time baseline, for example, a state such as a data delay constraint.

In addition, to better improve a construction effect of the baseline instance, the present application further provides a possible implementation of step 12. In this implementation, step 12 may specifically include the following steps 121 to 124.

Step 121: constructing, in the task link graph, a node corresponding to the baseline guarantee task, and determining a node parameter of the node corresponding to the baseline guarantee task according to the baseline commitment delay and the baseline early warning delay.

The node corresponding to the baseline guarantee task is used to represent the baseline guarantee task. For example, when the baseline guarantee task is the task 1 shown in FIG. 2, the node corresponding to the baseline guarantee task may be the node 1 shown in FIG. 2; or when the baseline guarantee task is the task 2 shown in FIG. 2, the node corresponding to the baseline guarantee task may be the node 2 shown in FIG. 2.

In addition, the present application does not limit an implementation of constructing a node in the task link graph. For example, the implementation may specifically be: adding a new node to the task link graph, so that the new node can represent a task corresponding to the new node.

In addition, for a node corresponding to any baseline guarantee task, a node parameter of the node corresponding to the baseline guarantee task is used to represent a state presented by the baseline guarantee task in a real-time baseline; and the present application does not limit the node parameter of the node corresponding to the baseline guarantee task. For example, the node parameter may include at least a task delay constraint. The task delay constraint of the node corresponding to the baseline guarantee task refers to a data delay constraint set for the baseline guarantee task; and the present application does not limit an implementation of the task delay constraint of the node corresponding to the baseline guarantee task. For example, the task delay constraint of the node corresponding to the baseline guarantee task may include the baseline commitment delay and the baseline early warning delay, so that the baseline commitment delay can represent a commitment delay constraint of the node corresponding to the baseline guarantee task, and the baseline early warning delay can represent an early warning delay constraint of the node corresponding to the baseline guarantee task.

In addition, in a possible implementation, the node parameter of the node corresponding to the baseline guarantee task may include not only the baseline commitment delay and the baseline early warning delay, but also the task delay gain coefficient, so that the node parameter can more comprehensively represent a state presented by the baseline guarantee task in the real-time baseline.

Furthermore, in a possible implementation, the node parameter of the node corresponding to the baseline guarantee task may include a task hierarchy of the node corresponding to the baseline guarantee task, and the task hierarchy of the node corresponding to the baseline guarantee task is a preset hierarchy. The preset hierarchy refers to a task hierarchy preset for the baseline guarantee task; and the present application does not limit the preset hierarchy. For example, the preset hierarchy may be 0.

It can be learned from the related content of step 121 that in a possible implementation, if the baseline construction parameter includes a task identifier of at least one baseline guarantee task, a node corresponding to each baseline guarantee task may be constructed in the task link graph, and a node parameter of the node corresponding to each baseline guarantee task is determined according to the baseline commitment delay and the baseline early warning delay, so that the finally constructed baseline instance includes the nodes corresponding to the baseline guarantee tasks and the node parameters of the nodes corresponding to the baseline guarantee tasks. It should be noted that because node parameters of the nodes corresponding to the baseline guarantee tasks are consistent, to save storage resources, one node parameter may be first stored; and then a correspondence between the nodes corresponding to the baseline guarantee tasks and a storage location of the node parameter is established, so that the nodes corresponding to the plurality of baseline guarantee tasks can share the same node parameter, thereby facilitating saving storage resources.

step 122: determining, according to the data dependency relationship between the at least two real-time tasks, an upstream task of a target task from the at least two real-time tasks; an initial value of the target task is the baseline guarantee task, and the data dependency relationship between the at least two real-time tasks includes a data dependency relationship between the target task and the upstream task.

The target task refers to a task that needs to perform an upstream task determination process in a current round; and a node corresponding to the target task exists in the above task link graph. In addition, an initial value of the target task is a baseline guarantee task. For example, as shown in FIG. 2, the initial value of the target task may be the task 1.

In addition, for the target task, an upstream task of the target task refers to a task that directly provides data for the target task, so that the target task can directly perform corresponding processing according to the data provided by the upstream task, so that there is a data dependency relationship between the target task and the upstream task, so that the upstream task of the target task can be quickly determined from the at least two real-time tasks based on the data dependency relationship. For example, if the target task is the task 1 shown in FIG. 2, upstream tasks of the target task include the task 3 shown in FIG. 2 and the task 4 shown in FIG. 2.

It can be learned from the related content of step 122 that for the current round, after the target task, for example, the task 1 shown in FIG. 2, is determined, an upstream task of the target task, for example, the task 3 shown in FIG. 2 and the task 4 shown in FIG. 2, may be determined from the at least two real-time tasks according to the data dependency relationship between the at least two real-time tasks, so that the upstream task can represent a task that directly provides data for the target task, so that another node connected to a node corresponding to the target task, for example, the node 3 and the node 4 shown in FIG. 2, can be constructed based on the upstream task.

Step 123: constructing, in the task link graph, a node corresponding to the upstream task, constructing, in the task link graph, a connection relationship between the node corresponding to the upstream task and the node corresponding to the target task, and determining a node parameter of the node corresponding to the upstream task according to the task delay gain coefficient and a node parameter of the node corresponding to the target task.

The node corresponding to the upstream task is used to represent the upstream task of the above target task. For example, if the upstream tasks of the target task include the task 3 shown in FIG. 2, the node corresponding to the upstream task may include the node 3 shown in FIG. 2.

In addition, for the upstream task of the target task, the connection relationship between the node corresponding to the upstream task and the node corresponding to the target task is used to represent the data dependency relationship between the upstream task and the target task; and the present application does not limit an implementation of the "connection relationship between the node corresponding to the upstream task and the node corresponding to the target task". For example, the connection relationship may be implemented by using a directed edge, for example, a directed edge between the node 3 and the node 1 shown in FIG. 2.

In addition, for the upstream task of the target task, a node parameter of the node corresponding to the upstream task is used to represent a state presented by the upstream task in a real-time baseline; and the present application does not limit an implementation of the node parameter of the node corresponding to the upstream task. For example, the node parameter of the node corresponding to the upstream task may include at least one of a task delay constraint of the node corresponding to the upstream task, a task hierarchy of the node corresponding to the upstream task, and an impact task identifier of the node corresponding to the upstream task. The task delay constraint of the node corresponding to the upstream task is used to describe a data delay constraint that needs to be met by the upstream task; and the present application does not limit an implementation of the task delay constraint of the node corresponding to the upstream task. For example, the task delay constraint of the node corresponding to the upstream task may include a task commitment delay and/or a task early warning delay of the upstream task. The task commitment delay refers to a maximum data delay that needs to be met by the upstream task, so that the task commitment delay can represent a commitment delay constraint of the node corresponding to the upstream task. The task early warning delay refers to an amount of early data delay discovery that needs to be met by the upstream task, so that the task early warning delay can represent an early warning delay constraint of the node corresponding to the target task. The task hierarchy of the node corresponding to the upstream task is used to represent which layer the node corresponding to the upstream task is located at in the task link graph. The impact task identifier of the node corresponding to the upstream task is used to represent which baseline guarantee task is affected when a data delay occurs at the upstream task.

In addition, for the upstream task of the target task, a node parameter of the node corresponding to the upstream task may be determined according to the task delay gain coefficient and a node parameter of the node corresponding to the target task; and the present application does not limit the determination process. For ease of understanding, the following uses three examples for description.

Example 1: for the upstream task of the target task, when the node parameter of the node corresponding to the upstream task includes a task delay constraint, the task delay constraint of the node corresponding to the upstream task is determined according to a product of the task delay gain coefficient and a task delay constraint of the node corresponding to the target task. It can be seen that in a possible implementation, if the task delay constraint includes a commitment delay constraint and an early warning delay constraint, a commitment delay constraint of the node corresponding to the upstream task=the commitment delay constraint of the node corresponding to the target task×the task delay gain coefficient, and an early warning delay constraint of the node corresponding to the upstream task=the early warning delay constraint of the node corresponding to the target task×the task delay gain coefficient.

Example 2: for the upstream task of the target task, when the node parameter of the node corresponding to the upstream task includes a task hierarchy, the task hierarchy of the node corresponding to the upstream task is determined according to a sum of a preset hierarchy step and the task hierarchy of the node corresponding to the target task. The preset hierarchy step is used to describe a hierarchy difference between two adjacent node layers; and the present application does not limit the preset hierarchy step. For example, the preset hierarchy step may be 1. Based on this, it can be learned that in a possible implementation, the task hierarchy of the node corresponding to the upstream task=the task hierarchy of the node corresponding to the target task+the preset hierarchy step.

Example 3: for the upstream task of the target task, when the node parameter of the node corresponding to the upstream task includes an impact task identifier, if the target task is a baseline guarantee task, the impact task identifier of the node corresponding to the upstream task being determined according to a task identifier of the target task, so that the impact task identifier of the node corresponding to the upstream task includes the task identifier of the target task; or if the target task is not a baseline guarantee task, the impact task identifier of the node corresponding to the upstream task being determined according to an impact task identifier of the node corresponding to the target task, so that the impact task identifier of the node corresponding to the upstream task includes the impact task identifier of the node corresponding to the target task.

It can be learned from the related content of step 123 that for the current round, after an upstream task of the above target task, for example, the task 3 and the task 4 shown in FIG. 2, is obtained, a node corresponding to the upstream task, for example, the node 3 and the node 4 shown in FIG. 2, is constructed in the task link graph, a connection relationship between the node corresponding to the upstream task and the node corresponding to the target task is constructed in the task link graph, and a node parameter of the node corresponding to the upstream task is determined according to the task delay gain coefficient and a node parameter of the node corresponding to the target task, so that the finally constructed baseline instance includes the node corresponding to the upstream task, the connection relationship between the node corresponding to the upstream task and the node corresponding to the target task, and the node parameter of the node corresponding to the upstream task.

Step 124: updating a traversal description state of the node corresponding to the target task to a traversed state, updating the target task by using the task corresponding to the node in the task link graph that is in the untraversed state, and returning to continue to perform step 122 and subsequent steps, until all nodes in the task link graph are in the traversed state.

The traversal description state of the node corresponding to the target task is used to represent whether the node has been traversed in a current traversal process. If the traversal description state of the node corresponding to the target task is the untraversed state, it can be determined that the node has not been traversed in the current traversal process. If the traversal description state of the node corresponding to the target task is the traversed state, it may be determined that the node has been traversed in the current traversal process.

The node in the task link graph that is in the untraversed state refers to a node that has not been traversed in the current traversal process, so that the "node in the task link graph that is in the untraversed state" can represent a node that is constructed in a construction process of the baseline instance but that has not been processed. It should be noted that the other processing may include connection node construction processing shown in steps 122 to 123.

In addition, the present application does not limit an implementation of the step "update the target task by using the task corresponding to the node in the task link graph that is in the untraversed state" in step 124. For example, the implementation may specifically be: randomly select one node from the nodes in the task link graph that are in the untraversed state, and use a task corresponding to the selected node as the updated target task.

In addition, to better improve the construction effect of the baseline instance, the construction process of the baseline instance may be implemented by using a breadth first search (BFS) manner. Based on this, the present application further provides a possible implementation of the step "update the target task by using the task corresponding to the node in the task link graph that is in the untraversed state" in step 124. In this implementation, when the above node parameter includes a task hierarchy and the node in the task link graph that is in the untraversed state includes at least one candidate node, an update process of the target task may include the following steps 1241 to 1242.

Step 1241: selecting a to-be-used node from the at least one candidate node according to a task hierarchy of each candidate node, where the task hierarchy of the to-be-used node is not higher than a task hierarchy of a node other than the to-be-used node in the at least one candidate node.

The to-be-used node refers to a node selected from the at least one candidate node; and the task hierarchy of the to-be-used node is not higher than a task hierarchy of a node other than the to-be-used node in the at least one candidate node, so that the to-be-used node can represent a node with a minimum task hierarchy in the at least one candidate node, so that the to-be-used node can represent a node that has not been traversed in a current traversal process and that has a minimum task hierarchy. For example, when the at least one candidate node includes the node 2, the node 3, and the node 4 shown in FIG. 3, the to-be-used node may be the node 2.

Step 1242: updating the target task by using a task corresponding to the to-be-used node.

In the present application, after the to-be-used node is obtained, a task corresponding to the to-be-used node may be directly determined as the updated target task, so that the baseline instance can be continuously constructed based on the updated target task.

It can be learned from the related content of steps 1241 to 1242 that in some application scenarios, for the current round, first obtain a node that exists in a current task link graph and that is in the untraversed state, for example, the node 2, the node 3, and the node 4 shown in FIG. 3; then select, from these nodes, one node with a lowest task hierarchy as the to-be-used node, for example, the node 2 shown in FIG. 3; and then determine a task corresponding to the to-be-used node as the updated target task, so that the baseline instance can be continuously constructed based on the updated target task.

It can be learned from the related content of steps 121 to 124 that in a possible implementation, the baseline instance may be constructed by using a BFS manner starting from the baseline guarantee task, so that the constructed baseline instance may include a node corresponding to at least two real-time tasks and a node parameter of each node, so that the baseline instance can describe related information, for example, information such as a data delay constraint, of all tasks used to process the real-time data stream.

In fact, in some application scenarios, there is a relatively complex data dependency relationship between some tasks, for example, a data dependency relationship between the task 2, the task 4, and the task 5 shown in FIG. 2, so that the complex data dependency relationship increases the construction difficulty of the baseline instance.

Based on the foregoing situation, to better improve the construction effect of the baseline instance, the present application further provides a possible implementation of the construction process of the baseline instance. In this implementation, the construction process of the baseline instance may include the following steps 125 to 130.

Step 125: constructing, in the task link graph, a node corresponding to the baseline guarantee task, and determining a node parameter of the node corresponding to the baseline guarantee task according to the baseline commitment delay and the baseline early warning delay.

It should be noted that for the related content of step 125, refer to step 121.

Step 126: determining, according to the data dependency relationship between the at least two real-time tasks, an upstream task of a target task from the at least two real-time tasks; an initial value of the target task is the baseline guarantee task, and the data dependency relationship between the at least two real-time tasks includes a data dependency relationship between the target task and the upstream task.

It should be noted that for the related content of step 126, refer to step 122.

Step 127: determining whether there is a node corresponding to the upstream task of the target task in the above task link graph; if yes, performing the following step 128 and step 130 sequentially; or if no, performing the following step 129 and step 130 sequentially.

Step 128: if there is a node corresponding to the upstream task of the target task in the above task link graph, constructing a connection relationship between the node corresponding to the upstream task and the node corresponding to the target task in the task link graph, and updating a node parameter of the node corresponding to the upstream task according to the task delay gain coefficient and a node parameter of the node corresponding to the target task.

In the present application, for the current round, for example, a round construction process in which the task 4 shown in FIG. 2 is used as the target task, after an upstream task of the target task, for example, the task 5 shown in FIG. 2, is obtained, it is first determined whether there is a node corresponding to the upstream task in the current task link graph, so that when it is determined that there is already the node corresponding to the upstream task in the current task link graph, it can be determined that the node corresponding to the upstream task has been constructed in the task link graph. Therefore, a connection relationship between the node corresponding to the upstream task and the node corresponding to the target task can be directly constructed in the task link graph, and a node parameter of the node corresponding to the upstream task is updated according to the task delay gain coefficient and a node parameter of the node corresponding to the target task, so that a problem caused by a complex data dependency relationship can be effectively solved.

In addition, the present application does not limit an implementation of the foregoing "update a node parameter of the node corresponding to the upstream task according to the task delay gain coefficient and a node parameter of the node corresponding to the target task". For example, the implementation is similar to the implementation of the foregoing step "determining a node parameter of the node corresponding to the upstream task according to the task delay gain coefficient and a node parameter of the node corresponding to the target task". For the sake of brevity, details are not described herein again.

Step 129: if there is no node corresponding to the upstream task of the target task in the above task link graph, constructing, in the task link graph, a node corresponding to the upstream task, constructing, in the task link graph, a connection relationship between the node corresponding to the upstream task and the node corresponding to the target task, and determining a node parameter of the node corresponding to the upstream task according to the task delay gain coefficient and a node parameter of the node corresponding to the target task.

It should be noted that for the related content of step 129, refer to step 123.

Step 130: updating a traversal description state of the node corresponding to the target task to a traversed state, updating the target task by using the task corresponding to the node in the task link graph that is in the untraversed state, and returning to continue to perform step 126 and subsequent steps, until all nodes in the task link graph are in the traversed state.

It should be noted that for the related content of step 130, refer to step 124.

It can be learned from the related content of steps 125 to 130 that in some application scenarios, the baseline instance may be constructed by using a BFS manner starting from the baseline guarantee task, so that when a multipath traversal of a same task, for example, the task 5 shown in FIG. 2, is encountered in a traversal process, a task delay constraint of the task may be a minimum value of each path, and a task hierarchy of the task may be a maximum value of each path, so that the finally constructed baseline instance can represent, by using as few nodes as possible, a data dependency relationship between a plurality of real-time tasks.

It can be learned from the related content of S2 that after the baseline construction parameter is obtained, the baseline instance may be constructed according to the baseline construction parameter, so that the baseline instance can describe not only a data dependency relationship between full-link tasks used to process the real-time data stream, but also related parameter information, for example, information such as a data delay constraint, a hierarchy, and an impact task identifier, of each real-time task in the full-link tasks, so that a data delay state of the full-link tasks can be detected based on the baseline instance.

S3: obtaining a data delay detection result of each real-time task.

The data delay detection result of any real-time task is used to represent a task delay of the real-time task, so that the data delay detection result of the real-time task can represent a timeliness of the real-time task.

In addition, the present application does not limit an implementation of S3. For example, the implementation may be performed by using any existing or future method that can obtain a data delay detection result of a real-time task, for example, a detection method with the aid of a task delay service shown in FIG. 5. The task delay service is configured to detect a task delay of each real-time task involved in a real-time baseline.

S4: determining delay state representation data of the baseline instance according to data delay detection results of the at least two real-time tasks.

The delay state representation data of the baseline instance is used to represent a data delay state presented by a full-link task in the baseline instance.

In addition, the present application does not limit an implementation of the delay state representation data of the baseline instance. For example, the delay state representation data of the baseline instance may include at least one of a baseline state and a baseline event. The baseline state is used to describe a data delay of a baseline guarantee task involved in the baseline instance. The baseline event is used to describe a data delay of a task other than the baseline guarantee task involved in the baseline instance.

In addition, to better determine the data delay state presented by the baseline instance, the present application further provides a possible implementation of S4. In this implementation, when the above node parameter includes a task delay constraint, S4 may specifically be: determining the delay state representation data of the baseline instance according to the data delay detection results of the at least two real-time tasks and the task delay constraint of each node in the above task link graph. To facilitate understanding, the following uses two examples for description.

Example 1: When the at least two real-time tasks include at least one baseline guarantee task, for example, the task 1 to the task 3 shown in FIG. 4, and the delay state representation data of the above baseline instance includes the baseline state, a determination process of the baseline state may include the following steps 21 to 22.

Step 21: for any baseline guarantee task, determining a data delay state corresponding to the baseline guarantee task according to a comparison result between a data delay detection result of the baseline guarantee task and a task delay constraint of a node used to represent the baseline guarantee task.

A data delay state corresponding to an $m^{th}$ baseline guarantee task is used to describe a data delay presented by the $m^{th}$ baseline guarantee task. Where m is a positive integer, m≤M, M is a positive integer, and M represents the number of tasks in the at least one baseline guarantee task.

In addition, for the foregoing $m^{th}$ baseline guarantee task, a determination process of the data delay state corresponding to the $m^{th}$ baseline guarantee task may be: determining the data delay state corresponding to the $m^{th}$ baseline guarantee task according to a comparison result between a data delay detection result of the $m^{th}$ baseline guarantee task and a task delay constraint of a node used to represent the $m^{th}$ baseline guarantee task. The data delay detection result of the $m^{th}$ baseline guarantee task is used to represent a task delay of the $m^{th}$ baseline guarantee task. The "node used to represent the $m^{th}$ baseline guarantee task" refers to a node corresponding to the $m^{th}$ baseline guarantee task. The "task delay constraint of the node used to represent the $m^{th}$ baseline guarantee task" is used to describe a data delay constraint that needs to be met by the $m^{th}$ baseline guarantee task. The "task delay constraint of the node used to represent the $m^{th}$ baseline guarantee task" may include the foregoing baseline commitment delay and the foregoing baseline early warning delay. The comparison result is used to represent a relative size between the task delay of the $m^{th}$ baseline guarantee task and the data delay constraint.

In addition, the present application does not limit the determination process of the data delay state corresponding to the $m^{th}$ baseline guarantee task. For example, when the foregoing "task delay constraint of the node used to represent the $m^{th}$ baseline guarantee task" includes the baseline commitment delay and the baseline early warning delay, the determination process of the data delay state corresponding to the $m^{th}$ baseline guarantee task may specifically be: first obtaining a comparison result between a data delay detection result of the $m^{th}$ baseline guarantee task and a task delay constraint of a node used to represent the $m^{th}$ baseline guarantee task; and if the comparison result indicates that the data delay detection result of the $m^{th}$ baseline guarantee task exceeds the baseline commitment delay, determining a preset broken-line state as the data delay state corresponding to the $m^{th}$ baseline guarantee task; or if the comparison result indicates that the data delay detection result of the $m^{th}$ baseline guarantee task does not exceed the baseline commitment delay but exceeds the baseline early warning delay, determining a preset early warning state as the data delay state corresponding to the $m^{th}$ baseline guarantee task; or if the comparison result indicates that the data delay detection result of the $m^{th}$ baseline guarantee task does not exceed the baseline early warning delay, determining a preset safe state as the data delay state corresponding to the $m^{th}$ baseline guarantee task. The preset broken-line state is used to describe the broken-line state, and the preset broken-line state may be preset. The preset early warning state is used to describe the early warning state, and the preset early warning state may be preset. The preset safe state is used to describe the safe state, and the preset safe state may be preset.

It can be learned from the related content of step 21 that for the constructed baseline instance, if the baseline instance includes the at least one baseline guarantee task, for any baseline guarantee task, after a data delay detection result of the baseline guarantee task is obtained, the data delay detection result of the baseline guarantee task may be first compared with a task delay constraint of a node used to represent the baseline guarantee task, to obtain a comparison result; and then a data delay state corresponding to the baseline guarantee task is determined according to the comparison result, so that the data delay state can represent a data delay presented by the baseline guarantee task.

Step 22: selecting, according to state levels of the data delay states corresponding to the baseline guarantee tasks, a target state from the data delay states corresponding to the at least one baseline guarantee task, and using the target state as the baseline state; the state level of the target state is not lower than state levels of data delay states other than the target state in the data delay states corresponding to the at least one baseline guarantee task.

A state level of a data delay state corresponding to an $m^{th}$ baseline guarantee task is used to describe an importance level of the data delay state corresponding to the $m^{th}$ baseline guarantee task.

In addition, the present application does not limit a determination process of the state level of the data delay state corresponding to the $m^{th}$ baseline guarantee task. For example, the determination process may specifically be: finding, from a pre-constructed mapping relationship, a state level corresponding to the data delay state corresponding to the $m^{th}$ baseline guarantee task, and using the state level as the state level of the data delay state corresponding to the $m^{th}$ baseline guarantee task. The mapping relationship is used to record state levels corresponding to various data delay states. For example, the mapping relationship includes a correspondence between a preset broken-line state and a first state level, a correspondence between a preset early warning state and a second state level, and a correspondence between a preset safe state and a third state level. The first state level is higher than the second state level, and the second state level is higher than the third state level.

The target state refers to a state selected from the data delay states corresponding to the at least one baseline guarantee task, so that the state level of the target state is not lower than state levels of data delay states other than the target state in the data delay states corresponding to the at least one baseline guarantee task, so that the target state can represent a state with a highest level that exists in the data delay states corresponding to the at least one baseline guarantee task. For ease of understanding, the following uses an example for description.

For example, for the baseline instance shown in FIG. 4, the baseline instance includes three baseline guarantee tasks: the task 1 to the task 3. In addition, according to related data shown in FIG. 4, it can be learned that a data delay state corresponding to the task 1 is the preset broken-line state, a data delay state corresponding to the task 2 is the preset early warning state, and a data delay state corresponding to the task 3 is the preset safe state. Based on this, it can be learned that because a state level of the preset broken-line state is the highest, the preset broken-line state may be determined as the baseline state of the baseline instance, so that the baseline state can represent that a task delay of at least one baseline guarantee task in the baseline instance is greater than the baseline commitment delay.

It can be learned from the related content of steps 21 to 22 that for the constructed baseline instance, the baseline state of the baseline instance may be determined according to data delay detection results and data delay constraints of the baseline guarantee tasks in the baseline instance, so that the baseline state can represent data delays of the baseline guarantee tasks.

Example 2: when the at least two real-time tasks include the baseline guarantee task and at least one first task, there is a direct or indirect data dependency relationship between the baseline guarantee task and each first task, the above task link graph includes a path corresponding to the baseline guarantee task, the path includes a node used to represent the baseline guarantee task and a node used to represent each first task, a start point of the path is the node used to represent the baseline guarantee task, the above node parameter includes a task hierarchy, and the delay state representation data of the above baseline instance includes the baseline event, a trigger process of the baseline event may include the following steps 31 to 33. The first task represents a task that directly or indirectly provides data for the baseline guarantee task.

Step 31: determining a target node from nodes other than the start point in the path that are in the untraversed state, a task hierarchy of the target node being not higher than a task hierarchy of a node other than the target node in the nodes that are in the untraversed state.

The path corresponding to the baseline guarantee task refers to a path corresponding to the baseline guarantee task as a start point that exists in the above task link graph. For example, if the baseline guarantee task is the task 1 shown in FIG. 4, the path corresponding to the baseline guarantee task may include at least a path from the node 8 to the node 7 to the node 4 to the node 1.

The target node refers to a node used to represent a non-baseline characterization task and that needs to determine a data delay; and a determination process of the target node is: determining the target node from nodes other than the start point in the path that are in the untraversed state, so that a task hierarchy of the target node is not higher than a task hierarchy of a node other than the target node in the nodes that are in the untraversed state, so that the target node can represent a node used to represent the non-baseline characterization task that exists in the path, that is in the untraversed state, and that has a lowest task hierarchy.

step 32: if a data delay detection result of a task represented by the above target node exceeds a task delay constraint of the target node, when it is determined that there is no node in which a baseline event is triggered in the above path, triggering a baseline event corresponding to the target node.

The task delay constraint of the target node is used to represent a data delay constraint that needs to be met by a task corresponding to the target node; and the present application does not limit the task delay constraint. For example, the task delay constraint may include at least a task commitment delay.

In addition, the present application does not limit an implementation of step 32. For example, in some possible implementations, to better avoid a problem caused by repeatedly creating the baseline event, the present application further provides a possible implementation of step 32. In this implementation, step 32 may specifically include the following steps 321 to 322.

Step 321: if a data delay detection result of a task represented by the above target node exceeds a task delay constraint of the target node, when it is determined that there is no node in which a baseline event is triggered in the above path, and it is determined that there is no baseline event corresponding to the target node, creating a baseline event corresponding to the target node.

In the present application, for the target node determined from the path corresponding to the foregoing baseline guarantee task, if a data delay detection result of a task represented by the target node exceeds a task commitment delay of the target node and there is no node in which a baseline event is triggered in the path, it may be determined that the target node meets a baseline event trigger condition. Therefore, it is further queried whether there is a historical baseline event constructed for the target node. If there is no historical baseline event constructed for the target node, a baseline event corresponding to the target node is directly created.

Step 322: if a data delay detection result of a task represented by the above target node exceeds a task delay constraint of the target node, when it is determined that there is no node in which a baseline event is triggered in the above path, and it is determined that there is a baseline event corresponding to the target node, updating a duration parameter of the baseline event corresponding to the target node.

In the present application, for the target node determined from the path corresponding to the foregoing baseline guarantee task, if a data delay detection result of a task represented by the target node exceeds a task commitment delay of the target node and there is no node in which a baseline event is triggered in the path, it may be determined that the target node meets a baseline event trigger condition. Therefore, it is further queried whether there is a historical baseline event constructed for the target node. If there is a historical baseline event constructed for the target node, the historical baseline event may be directly reused. Therefore, a duration parameter of the baseline event corresponding to the target node may be directly updated.

It can be learned from the related content of steps 321 to 322 that in some application scenarios, for the target node that meets the baseline event trigger condition, it may be first queried whether there is a historical baseline event constructed for the target node; and then a baseline event trigger manner that needs to be used for the target node is determined based on a query result, for example, a baseline event is created or a duration parameter of the baseline event is updated. In this way, the baseline event can be reused, so that adverse effects caused by repeatedly creating and deleting the baseline event for one node can be avoided.

In addition, in a possible implementation, to better traverse the path corresponding to each baseline guarantee task, step 32 may specifically be: if a data delay detection result of a task represented by the above target node exceeds a task delay constraint of the target node, when it is determined that there is no node in which a baseline event is triggered in the above path, triggering a baseline event corresponding to the target node, updating a traversal description state of the target node to a traversed state, and returning to continue to perform step 31 and subsequent steps. In this way, it is beneficial to determining a data delay of each node in the path.

Step 33: if a data delay detection result of a task represented by the target node does not exceed a task delay constraint of the target node, updating a traversal description state of the target node to a traversed state, and returning to continue to perform step 31 and subsequent steps.

In the present application, for the target node determined from the path corresponding to the foregoing baseline guarantee task, if a data delay detection result of a task represented by the target node does not exceed a task commitment delay of the target node, it may be determined that the target node does not meet a baseline event trigger task. Therefore, it is directly returned to continue to perform step 31 and subsequent steps.

It can be learned from the related content of steps 31 to 33 that in some application scenarios, for the foregoing baseline instance, other tasks except the baseline guarantee task in the task link graph may be traversed by using a BFS manner starting from the baseline guarantee task. After starting from the baseline guarantee task, if a first task for which a task delay is greater than a task commitment delay is encountered in a current path, a baseline event is triggered. In this way, a trigger frequency of the baseline event is reduced. For example, as shown in FIG. 4, after the baseline event is triggered by the task 4, if it is determined that a task delay of the task 7 exceeds a task commitment delay corresponding to the task 7, because the task 7 is not the first task on a current path for which a task delay is greater than a task commitment delay, it may be determined that the task 7 does not meet a baseline event trigger condition. Therefore, a baseline event does not need to be triggered for the task 7.

In addition, in some application scenarios, to better reduce the trigger frequency of the baseline event, the present application further provides a possible implementation of the foregoing baseline event trigger condition. In this implementation, the baseline event trigger condition may specifically be: a first task on a current path for which a task delay is greater than a task commitment delay, and a downstream task of the task has not triggered a baseline event. For ease of understanding, the following uses an example for description.

For example, for a path from the node 8 to the node 7 to the node 5 to the node 1, when the node 7 is traversed, although a task represented by the node 7 is the first task on the path for which a task delay is greater than a task commitment delay, because a downstream task of the node 7, that is, the task 4, has triggered a baseline event, a task represented by the node 7 does not meet a baseline event trigger condition. Therefore, a baseline event does not need to be triggered for the task 7.

In addition, to better improve the reuse effect of the baseline event, the present application further provides a possible implementation of the trigger process of the foregoing baseline event. In this implementation, the trigger process of the baseline event includes not only steps 31 to 33, but also the following step 34.

Step 34: if a data delay detection result of a task represented by the above target node does not exceed a task delay constraint of the target node, there is a baseline event corresponding to the target node, and an event state of the baseline event corresponding to the target node is a first state value, updating the event state of the baseline event corresponding to the target node from the first state value to a second state value.

The first state value is used to represent that the baseline event is in a duration state; and the present application does not limit an implementation of the first state value. For example, the first state value may be implemented by using a character string "not recovered".

The second state value is used to represent that the baseline event is in a non-trigger state; and the present application does not limit an implementation of the second state value. For example, the second state value may be implemented by using a character string "recovered".

It can be learned from the related content of step 34 that for the target node determined from the path corresponding to the foregoing baseline guarantee task, if a data delay detection result of a task represented by the target node does not exceed a task commitment delay of the target node, it may be determined that the target node does not meet a baseline event trigger condition. Therefore, it is further queried whether there is a historical baseline event constructed for the target node. If there is a historical baseline event constructed for the target node, an event state of the historical baseline event may be adjusted to recovered.

It can be learned from the related content of the baseline event that the present application provides a generation, duration, and recovery process of the baseline event. The process may specifically be: for any task other than the baseline guarantee task in the foregoing baseline instance, when a task delay of the task continues to be greater than a task commitment delay corresponding to the task, a baseline event corresponding to the task may be continuously reused, and a duration is recorded, so that after a data delay of the task returns to normal, an event state of the baseline event corresponding to the task may be updated to recovered. Based on this, it can be learned that in a traversal process of the tasks other than the baseline guarantee task in the baseline instance, a delay of each task may be checked. If a current delay is less than the task commitment delay, the baseline event is not triggered, and it is queried whether there is a historical baseline event. If there is a historical baseline event, an event state of the historical baseline event is updated to recovered. If the current delay is greater than the task commitment delay and there is no triggered baseline event, a new baseline event is generated for the task, so that a duration of the baseline event is updated when it is determined that there is a corresponding baseline event. In this way, a quantity of baseline events can be reduced as much as possible, so that resource consumption caused by an excessive quantity of baseline events can be effectively avoided.

It can be learned from the related content of S1 to S4 that for the data delay detection method provided in this embodiment of the present application, a baseline construction parameter is first obtained; a baseline instance is constructed according to the baseline construction parameter, so that the baseline instance includes a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream; then a data delay detection result of each real-time task is obtained; and finally delay state representation data of the baseline instance is determined according to the data delay detection results of the at least two real-time tasks, so that the delay state representation data can better represent a data delay of a full-link task used to process the real-time data stream. In this way, a data delay of the full-link task can be obtained at the same time, so that a defect (for example, a full-link data delay cannot be perceived, and a main cause that leads to a delay alarm cannot be quickly found) caused when a data delay of a single task is obtained can be effectively avoided. This is beneficial to improving a data delay obtaining effect in a real-time data stream processing scenario. It can be seen that the data delay detection method provided in the present application can implement data delay detection and analysis of the full-link task, so that a task detection configuration and maintenance cost can be effectively reduced, and a user can be assisted in quickly locating a core task that causes a data delay.

In addition, the present application does not limit an execution subject of the data delay detection method provided in this embodiment of the present application. For example, the data delay detection method provided in this embodiment of the present application may be applied to a terminal device or a server. For another example, the data delay detection method provided in this embodiment of the present application may also be implemented by using a data exchange process between the terminal device and the server. The terminal device may be a smart phone, a computer, a personal digital assistant (PDA), a tablet computer, or the like. The server may be an independent server, a cluster server, or a cloud server.

In addition, to better improve a data delay detection effect, the present application further provides a possible implementation of the foregoing data delay detection method. In this implementation, when the above node parameter includes a task delay constraint, the at least two real-time tasks include at least one baseline guarantee task and at least one second task; a task delay constraint of a node used to represent the baseline guarantee task includes a baseline commitment delay and a baseline early warning delay; and for any second task, there is a direct or indirect data dependency relationship between the second task and one or more baseline guarantee tasks, the data delay detection method may include not only S1 to S4, but also the following step 41. The at least one second task may refer to a task other than the at least one baseline guarantee task in the at least two real-time tasks, for example, the task 4 to the task 8 shown in FIG. 4.

Step 41: generating alarm information according to the data delay detection results of the at least two real-time tasks and the task delay constraint of each node in the above task link graph.

The alarm information is used to describe a data delay alarm of the at least two real-time tasks, so that the alarm information can represent a data delay alarm of the full-link task in the above baseline instance.

In addition, the present application does not limit an implementation of the foregoing alarm information.

In addition, in some application scenarios, to better reduce an alarm information quantity, the present application further provides a possible implementation of the foregoing alarm information. In this implementation, the alarm information may include one or more of a baseline early warning alarm instance, a baseline broken-line alarm instance, and a baseline event alarm instance. The baseline early warning alarm instance is an aggregation result of baseline guarantee tasks that are in a preset early warning state, so that data delay detection results of the baseline guarantee tasks described in the baseline early warning alarm instance are all lower than a baseline commitment delay, and the data delay detection results of the baseline guarantee tasks described in the baseline early warning alarm instance exceed a baseline early warning delay, so that the baseline early warning alarm instance can aggregate and represent alarm information of a baseline early warning type. The baseline broken-line alarm instance is an aggregation result of baseline guarantee tasks that are in a preset broken-line state, so that data delay detection results of the baseline guarantee tasks described in the baseline broken-line alarm instance exceed the baseline commitment delay, so that the baseline broken-line alarm instance can aggregate and represent alarm information of a baseline broken-line type. The baseline event alarm instance is an aggregation result of baseline events triggered by second tasks that meet a baseline event trigger condition, so that the baseline event alarm instance is generated according to the baseline events triggered by the one or more second tasks. For any second task used to trigger a baseline event, a data delay detection result of the second task exceeds a task delay constraint of a node used to represent the second task, so that the baseline event alarm instance can aggregate and represent alarm information of a baseline event type.

It should be noted that for the at least one second task, after the second tasks are traversed, if there is at least one second task that meets the baseline event trigger condition, baseline events corresponding to these tasks may be aggregated into one baseline event alarm instance, so that the baseline event alarm instance can be subsequently forwarded to an alarm service shown in FIG. 5 for alarm sending processing.

It should also be noted that for the at least one baseline guarantee task, if there is one or more baseline guarantee tasks that are in the preset early warning state, the baseline guarantee tasks that are in the preset early warning state may be aggregated into one baseline early warning alarm instance, so that the baseline early warning alarm instance can be subsequently forwarded to the alarm service shown in FIG. 5 for alarm sending processing. Similarly, for the at least one baseline guarantee task, if there is one or more baseline guarantee tasks that are in the preset broken-line state, the baseline guarantee tasks that are in the preset broken-line state may be aggregated into one baseline broken-line alarm instance, so that the baseline broken-line alarm instance can be subsequently forwarded to the alarm service shown in FIG. 5 for alarm sending processing.

Figure 5:
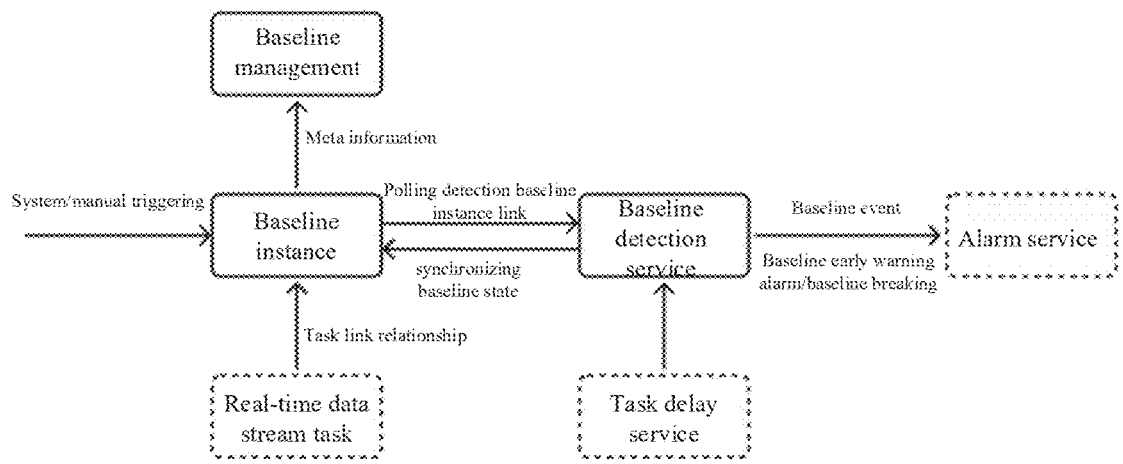
FIG. 5 is a schematic diagram of an architecture of a baseline-related service according to an embodiment of the present application.

It should be further noted that for the modules shown in FIG. 5, the baseline management module may be configured to create, edit, close, or delete a baseline. The baseline detection service module may be configured to be responsible for full-link task delay detection of the baseline, generate baseline early warning/broken-line and baseline events, and generate a corresponding alarm instance. The task delay service module may be configured to query a current output data delay time, that is, a task delay, of a streaming task. The alarm service module is configured to process logic such as alarm do-not-disturb, and may be configured to send alarm information according to a configured alarm manner.

It can be learned from the related content of step 41 that in some application scenarios, full-link task delay alarms in the baseline instance may be aggregated into different categories, so that for a multitask delay in the baseline instance, only a baseline early warning alarm, a baseline broken-line alarm, and a baseline event alarm need to be respectively triggered. This can improve alarm aggregation capability, so that an alarm sending frequency can be reduced, and attention can be better paid to a core task. In this way, frequent alarms can be effectively reduced to avoid disturbing and interfering with a user.

In addition, to better improve user experience, the present application further provides a possible implementation of the foregoing data delay detection method. In this implementation, the data delay detection method may include at least the following steps 42 to 43.

Step 42: constructing a delay analysis graph according to the above task link graph and the data delay detection results of the at least two real-time tasks.

The delay analysis graph is used to graphically display the data delay detection results of the at least two real-time tasks, so that the delay analysis graph can not only display the data delay detection results of the real-time tasks, but also display a data dependency relationship between the real-time tasks.

In addition, the foregoing delay analysis graph is constructed according to the above task link graph and the data delay detection results of the at least two real-time tasks, so that the delay analysis graph carries information described by the task link graph and information described by the data delay detection results of the real-time tasks.

In addition, the present application does not limit a construction method of the foregoing delay analysis graph.

Step 43: displaying the delay analysis graph.

It can be learned from the related content of steps 42 to 43 that in some application scenarios, the delay analysis graph may be constructed and displayed according to the above task link graph and the data delay detection results of the at least two real-time tasks, so that a user can quickly locate a root cause that leads to a task delay by using the delay analysis graph, and timeliness of problem solving is improved.

Figure 6:
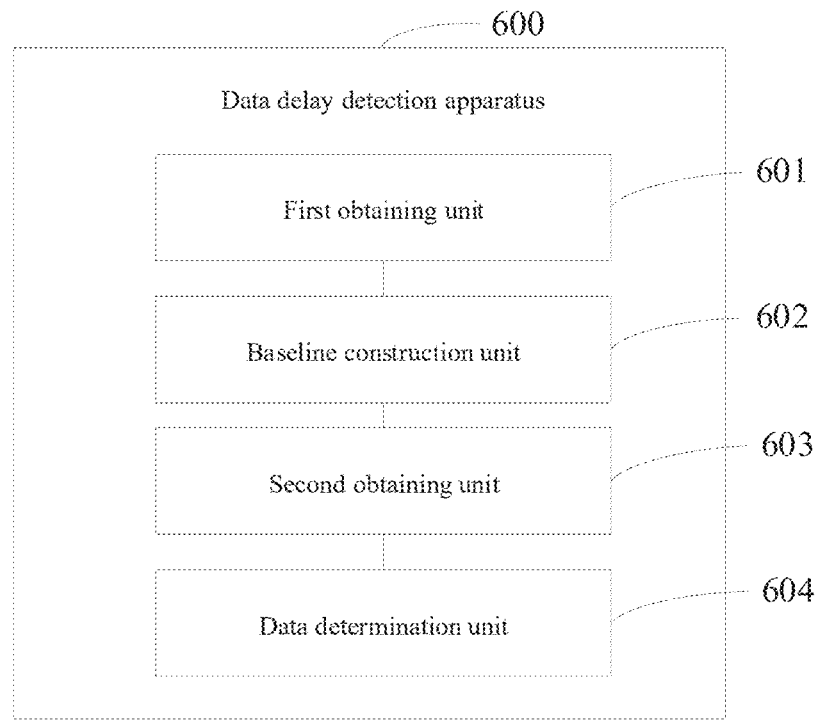
FIG. 6 is a schematic diagram of a structure of a data delay detection apparatus according to an embodiment of the present application.

Based on the data delay detection method provided in this embodiment of the present application, this embodiment of the present application further provides a data delay detection apparatus. The following uses FIG. 6 for explanation and description. FIG. 6 is a schematic structural diagram of a data delay detection apparatus according to an embodiment of the present application. It should be noted that for technical details of the data delay detection apparatus provided in this embodiment of the present application, refer to the related content of the data delay detection method.

As shown in FIG. 6, a data delay detection apparatus 600 provided in this embodiment of the present application includes: a first obtaining unit 601, configured to obtain a baseline construction parameter; a baseline construction unit 602, configured to construct a baseline instance according to the baseline construction parameter, the baseline instance including a task link graph and a node parameter of each node in the task link graph, the task link graph being used to describe a data dependency relationship between at least two real-time tasks, different nodes in the task link graph being used to represent different real-time tasks, and the at least two real-time tasks being used to process a real-time data stream; a second obtaining unit 603, configured to obtain a data delay detection result of each real-time task; and a data determination unit 604, configured to determine delay state representation data of the baseline instance according to the data delay detection results of the at least two real-time tasks.

In a possible implementation, the baseline construction parameter includes a task identifier, a baseline commitment delay, a baseline early warning delay, and a task delay gain coefficient of a baseline guarantee task; and the baseline construction unit 602 includes: a first determination subunit, configured to determine the at least two real-time tasks and a data dependency relationship between the at least two real-time tasks according to a pre-constructed task link relationship and the task identifier of the baseline guarantee task, the task link relationship including the data dependency relationship between the at least two real-time tasks, the at least two real-time tasks including the baseline guarantee task and a task that directly or indirectly provides data for the baseline guarantee task; and a baseline construction subunit, configured to construct the baseline instance according to the at least two real-time tasks, the data dependency relationship between the at least two real-time tasks, the baseline commitment delay, the baseline early warning delay, and the task delay gain coefficient.

In a possible implementation, the baseline construction subunit is specifically configured to: construct, in the task link graph, a node corresponding to the baseline guarantee task, and determine a node parameter of the node corresponding to the baseline guarantee task according to the baseline commitment delay and the baseline early warning delay; determine, according to the data dependency relationship between the at least two real-time tasks, an upstream task of a target task from the at least two real-time tasks, an initial value of the target task being the baseline guarantee task, the data dependency relationship between the at least two real-time tasks including a data dependency relationship between the target task and the upstream task; construct, in the task link graph, a node corresponding to the upstream task, construct a connection relationship between the node corresponding to the upstream task and the node corresponding to the target task in the task link graph, and determine a node parameter of the node corresponding to the upstream task according to the task delay gain coefficient and the node parameter of the node corresponding to the target task; update a traversal description state of the node corresponding to the target task to a traversed state; update the target task by using a task corresponding to a node that is in an untraversed state in the task link graph; and continue to perform the operation of determining, according to the data dependency relationship between the at least two real-time tasks, an upstream task of a target task from the at least two real-time tasks, until all nodes in the task link graph are in the traversed state.

In a possible implementation, the baseline construction subunit is further configured to: determine whether there is the node corresponding to the upstream task in the task link graph; and if there is the node corresponding to the upstream task in the task link graph, construct, in the task link graph, the connection relationship between the node corresponding to the upstream task and the node corresponding to the target task, and update the node parameter of the node corresponding to the upstream task according to the task delay gain coefficient and the node parameter of the node corresponding to the target task; and the baseline construction subunit is specifically configured to: if there is no node corresponding to the upstream task in the task link graph, construct, in the task link graph, the node corresponding to the upstream task.

In a possible implementation, the node parameter includes a task delay constraint; a task delay constraint of a node corresponding to the baseline guarantee task includes the baseline commitment delay and the baseline early warning delay; and a task delay constraint of a node corresponding to the upstream task is determined according to a product of the task delay gain coefficient and a task delay constraint of the node corresponding to the target task.

In a possible implementation, the node parameter includes a task hierarchy; a task hierarchy of a node corresponding to the baseline guarantee task is a preset hierarchy; and a task hierarchy of a node corresponding to the upstream task is determined according to a sum of a preset hierarchy step and a task hierarchy of the node corresponding to the target task.

In a possible implementation, the node parameter includes a task hierarchy; a node that is in the untraversed state in the task link graph includes at least one candidate node; and the baseline construction subunit is specifically configured to: select a node to be used from the at least one candidate node according to task hierarchies of the candidate nodes, a task hierarchy of the node to be used being not higher than task hierarchies of nodes other than the node to be used in the at least one candidate node; and update the target task by using a task corresponding to the node to be used.

In a possible implementation, the node parameter of the node corresponding to the upstream task includes an influence task identifier; and if the target task is the baseline guarantee task, the influence task identifier of the node corresponding to the upstream task is determined according to a task identifier of the target task; or if the target task is not the baseline guarantee task, the influence task identifier of the node corresponding to the upstream task is determined according to an influence task identifier of the node corresponding to the target task.

In a possible implementation, the node parameter includes a task delay constraint; and the data determination unit 604 is specifically configured to: determine the delay state representation data of the baseline instance according to the data delay detection results of the at least two real-time tasks and the task delay constraint of each node in the task link graph.

In a possible implementation, the at least two real-time tasks include at least one baseline guarantee task; the delay state representation data includes a baseline state; and a determination process of the baseline state includes: for any baseline guarantee task, determining a data delay state corresponding to the baseline guarantee task according to a comparison result between a data delay detection result of the baseline guarantee task and a task delay constraint of a node used to represent the baseline guarantee task; and selecting a target state from data delay states corresponding to the at least one baseline guarantee task according to state levels of the data delay states corresponding to the baseline guarantee tasks, and using the target state as the baseline state, a state level of the target state being not lower than state levels of data delay states other than the target state in the data delay states corresponding to the at least one baseline guarantee task.

In a possible implementation, the at least two real-time tasks include a baseline guarantee task and at least one first task; there is a direct or indirect data dependency relationship between the baseline guarantee task and each first task; the task link graph includes a path corresponding to the baseline guarantee task, the path includes a node used to represent the baseline guarantee task and a node used to represent each first task, a start point of the path is the node used to represent the baseline guarantee task; the node parameter includes a task hierarchy; the delay state representation data includes a baseline event; and a trigger process of the baseline event includes: determining a target node from nodes other than the start point in the path that are in an untraversed state, a task hierarchy of the target node being not higher than a task hierarchy of a node other than the target node in the nodes that are in the untraversed state; if a data delay detection result of a task represented by the target node exceeds a task delay constraint of the target node, when it is determined that there is no node in which a baseline event is triggered in the path, triggering a baseline event corresponding to the target node; or if a data delay detection result of a task represented by the target node does not exceed a task delay constraint of the target node, updating a traversal description state of the target node to a traversed state, and continuing to perform the operation of determining a target node from nodes other than the start point in the path that are in the untraversed state.

In a possible implementation, a trigger process of the baseline event corresponding to the target node includes: when it is determined that there is no baseline event corresponding to the target node, creating a baseline event corresponding to the target node; or when it is determined that there is a baseline event corresponding to the target node, updating a duration parameter of the baseline event corresponding to the target node.

In a possible implementation, the trigger process of the baseline event further includes: if a data delay detection result of a task represented by the target node does not exceed a task delay constraint of the target node, there is a baseline event corresponding to the target node, and an event state of the baseline event corresponding to the target node being a first state value, updating the event state of the baseline event corresponding to the target node from the first state value to a second state value.

In a possible implementation, the node parameter includes a task delay constraint; the at least two real-time tasks include at least one baseline guarantee task and at least one second task; a task delay constraint of a node used to represent the baseline guarantee task includes a baseline commitment delay and a baseline early warning delay; for any second task, there is a direct or indirect data dependency relationship between the second task and one or more baseline guarantee tasks; and the data delay detection apparatus 600 further includes:

an information generation unit, configured to generate alarm information according to the data delay detection results of the at least two real-time tasks and the task delay constraint of each node in the task link graph, the alarm information including one or more of a baseline early warning alarm instance, a baseline broken-line alarm instance, and a baseline event alarm instance; data delay detection results of the baseline guarantee tasks described in the baseline early warning alarm instance are all lower than the baseline commitment delay, and the data delay detection results of the baseline guarantee tasks described in the baseline early warning alarm instance exceed the baseline early warning delay, data delay detection results of the baseline guarantee tasks described in the baseline broken-line alarm instance exceed the baseline commitment delay, the baseline event alarm instance is generated according to the baseline events triggered by the one or more second tasks, and for any second task used to trigger a baseline event, a data delay detection result of the second task exceeds a task delay constraint of a node used to represent the second task.

In a possible implementation, the data delay detection apparatus 600 further includes: an analysis graph construction unit, configured to construct a delay analysis graph according to the task link graph and the data delay detection results of the at least two real-time tasks; and an analysis graph display unit, configured to display the delay analysis graph.

In a possible implementation, the first obtaining unit 601 is specifically configured to: receive a baseline construction request, the baseline construction request carries the baseline construction parameter.

It can be learned from the related content of the data delay detection apparatus 600 that for the data delay detection apparatus 600 provided in this embodiment of the present application, a baseline construction parameter is first obtained; a baseline instance is constructed according to the baseline construction parameter, so that the baseline instance includes a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream; then a data delay detection result of each real-time task is obtained; and finally delay state representation data of the baseline instance is determined according to the data delay detection results of the at least two real-time tasks, so that the delay state representation data can better represent a data delay of a full-link task used to process the real-time data stream. In this way, a data delay of the full-link task can be obtained at the same time, so that a defect (for example, a full-link data delay cannot be perceived, and a main cause that leads to a delay alarm cannot be quickly found) caused when a data delay of a single task is obtained can be effectively avoided. This is beneficial to improving a data delay obtaining effect in a real-time data stream processing scenario.

In addition, this embodiment of the present application further provides an electronic device. The device includes a processor and a memory. The memory is configured to store an instruction or a computer program. The processor is configured to execute the instruction or the computer program in the memory, so that the electronic device executes any implementation of the data delay detection method provided in this embodiment of the present application.

Figure 7:
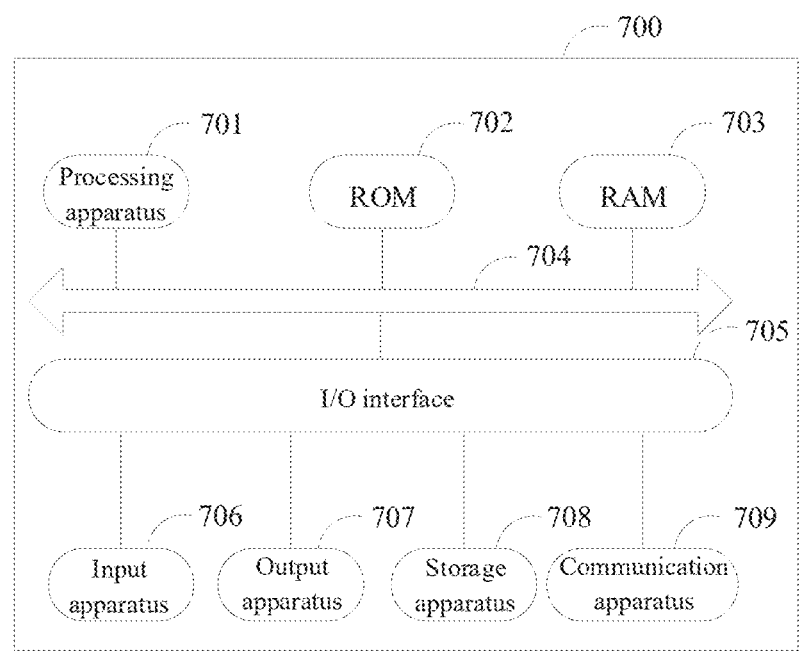
FIG. 7 is a schematic diagram of a structure of an electronic device according to an embodiment of the present application.

FIG. 7 shows a schematic structural diagram of an electronic device 700 suitable for implementing an embodiment of the present disclosure. A terminal device in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (for example, a vehicle navigation terminal), and fixed terminals such as a digital TV and a desktop computer. The electronic device shown in FIG. 7 is merely an example, and shall not impose any limitation on the function and scope of use of the embodiments of the present disclosure.

As shown in FIG. 7, the electronic device 700 may include a processing apparatus (for example, a central processing unit, a graphics processing unit, etc.) 701 that may perform a variety of appropriate actions and processing in accordance with a program stored in a read-only memory (ROM) 702 or a program loaded from a storage apparatus 708 into a random access memory (RAM) 703. The RAM 703 further stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touchpad, a keyboard, a mouse, a camera, a microphone, an accelerometer, and a gyroscope; an output apparatus 707 including, for example, a liquid crystal display (LCD), a speaker, and a vibrator; a storage apparatus 708 including, for example, a tape and a hard disk; and a communication apparatus 709. The communication apparatus 709 may allow the electronic device 700 to perform wireless or wired communication with other devices to exchange data. Although FIG. 7 shows the electronic device 700 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium; the computer program includes program code for performing the method shown in the flowchart. In such an embodiment, the computer program may be downloaded from a network through the communication apparatus 709, installed from the storage apparatus 708, or installed from the ROM 702. When the computer program is executed by the processing apparatus 701, the above-mentioned functions defined in the method of the embodiment of the present disclosure are performed.

The electronic device provided in this embodiment of the present disclosure and the method provided in the above embodiment belong to the same inventive concept. For technical details that are not described in detail in this embodiment, reference may be made to the above embodiment, and this embodiment and the above embodiment have the same beneficial effects.

This embodiment of the present application further provides a computer-readable medium. The computer-readable medium stores an instruction or a computer program. When the instruction or the computer program runs on a device, the device is enabled to perform any implementation of the data delay detection method provided in this embodiment of the present application.

It should be noted that the above computer-readable medium described in the present disclosure may be a computer-readable signal medium, a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, a client and a server may communicate by using any currently known or future-developed network protocol such as a hypertext transfer protocol (HTTP), and may be connected to digital data communication (for example, a communication network) in any form or medium. Examples of the communication network include a local area network ("LAN"), a wide area network ("WAN"), an internetwork (for example, the internet), an end-to-end network (for example, an ad hoc end-to-end network), and any currently known or future-developed network.

The above computer-readable medium may be contained in the above electronic device. Alternatively, the computer-readable medium may exist independently, and is not assembled into the electronic device.

The above computer-readable medium carries one or more programs, and when the one or more programs are executed by the electronic device, the electronic device can execute the above method.

Computer program code for performing operations of the present disclosure may be written in one or more programming languages or a combination thereof, the programming languages include but are not limited to an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case involving the remote computer, the remote computer may be connected to a computer of a user through any type of network, including a local area network (LAN) or a wide area network (WAN), or may be connected to an external computer (for example, connected through the internet by using an Internet service provider).

The flowcharts and block diagrams in the accompanying drawings illustrate possible system architectures, functions, and operations of the system, the method, and the computer program product according to various embodiments of the present disclosure. In this regard, each block in the flowchart or block diagram may represent a module, program segment, or part of code, and the module, program segment, or part of code contains one or more executable instructions for implementing a specified logical function. It should also be noted that in some alternative implementations, the functions marked in the blocks may also occur in an order different from that marked in the accompanying drawings. For example, two blocks shown in succession can actually be executed substantially in parallel, or they can sometimes be executed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The units described in the embodiments of the present disclosure may be implemented by software, or may be implemented by hardware. The name of a unit/a module does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

It should be noted that in the present specification, the embodiments are described in a progressive manner, and each embodiment focuses on differences from other embodiments. For parts that are the same or similar between the embodiments, reference may be made to each other. For a system or apparatus disclosed in the embodiments, since it corresponds to the method disclosed in the embodiments, the description is relatively simple, and for related parts, reference may be made to the description of the method part.

It should be understood that in the present application, "at least one (item)" means one or more, and "a plurality of" means two or more. "And/or" describes an association relationship between associated objects, and indicates that there may be three relationships. For example, "A and/or B" may indicate: only A exists, only B exists, and both A and B exist. Among them, A and B may be singular or plural. The character "/" generally indicates that the associated objects before and after are an "or" relationship. "At least one of the following" or a similar expression thereof means any combination of these items, including a single item (piece) or any combination of a plurality of items (pieces). For example, at least one of a, b, or c may indicate: a, b, c, "a and b", "a and c", "b and c", or "a, b, and c", where a, b, and c may be single or multiple.

It should also be noted that in this article, relational terms such as first and second are only used to distinguish one entity or operation from another entity or operation, and do not necessarily require or imply any such actual relationship or order between these entities or operations. Moreover, the terms "comprise", "include", or any other variant thereof are intended to cover a non-exclusive inclusion, so that a process, method, article, or device that includes a series of elements not only includes those elements, but also includes other elements not explicitly listed, or further includes elements inherent to such process, method, article, or device. Without more restrictions, an element defined by the statement "includes one . . . " does not exclude the presence of additional identical elements in the process, method, article, or device that includes the element.

The steps of the method or algorithm described in connection with the embodiments disclosed herein may be implemented directly by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The foregoing descriptions of the disclosed embodiments enable those skilled in the art to implement or use the present application. Various modifications to these embodiments will be apparent to those skilled in the art, and the general principles defined herein may be implemented in other embodiments without departing from the spirit or scope of the present application. Therefore, the present application will not be limited to the embodiments shown herein, but is to comply with the widest scope consistent with the principles and novel features disclosed herein.

What is claimed:

1. A data delay detection method, comprising:
   obtaining a baseline construction parameter;
   constructing a baseline instance according to the baseline construction parameter, wherein the baseline instance comprises a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream;
   obtaining a data delay detection result of each real-time task; and
   determining delay state characterization data of the baseline instance according to data delay detection results of the at least two real-time tasks, wherein
   the baseline construction parameter comprises a task identifier of a baseline guarantee task, a baseline commitment delay, a baseline early warning delay, and a task delay gain coefficient, and
   the constructing a baseline instance according to the baseline construction parameter comprises:
      determining the at least two real-time tasks and the data dependency relationship between the at least two real-time tasks according to a pre-constructed task link relationship and the task identifier of the baseline guarantee task, wherein the task link relationship comprises the data dependency relationship between the at least two real-time tasks, and the at least two real-time tasks comprise the baseline guarantee task and a task that directly or indirectly provides data for the baseline guarantee task; and
      constructing the baseline instance according to the at least two real-time tasks, the data dependency relationship between the at least two real-time tasks, the baseline commitment delay, the baseline early warning delay, and the task delay gain coefficient.

2. The method according to claim 1, wherein the constructing the baseline instance comprises:
   constructing, in the task link graph, a node corresponding to the baseline guarantee task, and determining a node parameter of the node corresponding to the baseline guarantee task according to the baseline commitment delay and the baseline early warning delay;
   determining, according to the data dependency relationship between the at least two real-time tasks, an upstream task of a target task from the at least two real-time tasks, wherein an initial value of the target task is the baseline guarantee task, and the data dependency relationship between the at least two real-time tasks comprises a data dependency relationship between the target task and the upstream task;
   constructing, in the task link graph, a node corresponding to the upstream task, constructing, in the task link graph, a connection relationship between the node corresponding to the upstream task and the node corresponding to the target task, and determining a node parameter of the node corresponding to the upstream task according to the task delay gain coefficient and the node parameter of the node corresponding to the target task; and
   updating a traversal description state of the node corresponding to the target task to a traversed state, updating the target task with a task corresponding to a node in an untraversed state in the task link graph, and continuing to perform the operation of determining, according to the data dependency relationship between the at least two real-time tasks, an upstream task of a target task from the at least two real-time tasks, until all nodes in the task link graph are in the traversed state.

3. The method according to claim 2, wherein after the determining, from the at least two real-time tasks, an upstream task of a target task, the method further comprises:
   determining whether there is a node corresponding to the upstream task in the task link graph; and
   if there is the node corresponding to the upstream task in the task link graph, constructing, in the task link graph, a connection relationship between the node corresponding to the upstream task and the node corresponding to the target task, and updating a node parameter of the node corresponding to the upstream task according to the task delay gain coefficient and the node parameter of the node corresponding to the target task; and the constructing, in the task link graph, a node corresponding to the upstream task comprises:

if there is no node corresponding to the upstream task in the task link graph, constructing, in the task link graph, the node corresponding to the upstream task.

4. The method according to claim 2, wherein the node parameter comprises a task delay constraint, a task delay constraint of the node corresponding to the baseline guarantee task comprises the baseline commitment delay and the baseline early warning delay, and a task delay constraint of the node corresponding to the upstream task is determined according to a product of the task delay gain coefficient and a task delay constraint of the node corresponding to the target task.

5. The method according to claim 2, wherein the node parameter comprises a task hierarchy;

a task hierarchy of the node corresponding to the baseline guarantee task is a preset hierarchy; and a task hierarchy of the node corresponding to the upstream task is determined according to a sum of a preset hierarchy step and a task hierarchy of the node corresponding to the target task.

6. The method according to claim 2, wherein the node parameter comprises a task hierarchy;

nodes in an untraversed state in the task link graph comprise at least one candidate node; and the updating the target task with a task corresponding to a node in an untraversed state in the task link graph comprises:

selecting a to-be-used node from the at least one candidate node according to a task hierarchy of each candidate node, wherein a task hierarchy of the to-be-used node is not higher than a task hierarchy of another node other than the to-be-used node in the at least one candidate node; and updating the target task with the task corresponding to the to-be-used node.

7. The method according to claim 2, wherein the node parameter of the node corresponding to the upstream task comprises an impact task identifier;

if the target task is the baseline guarantee task, the impact task identifier of the node corresponding to the upstream task is determined according to the task identifier of the target task; or if the target task is not the baseline guarantee task, the impact task identifier of the node corresponding to the upstream task is determined according to the impact task identifier of the node corresponding to the target task.

8. The method according to claim 1, wherein the node parameter comprises a task delay constraint, and the determining delay state characterization data of the baseline instance according to the data delay detection results of the at least two real-time tasks comprises:

determining the delay state characterization data of the baseline instance according to the data delay detection results of the at least two real-time tasks and the task delay constraint of each node in the task link graph.

9. The method according to claim 8, wherein the at least two real-time tasks comprise at least one baseline guarantee task, the delay state characterization data comprises a baseline state, and the determining a baseline state comprises:

for any baseline guarantee task, determining a data delay state corresponding to the baseline guarantee task according to a comparison result between a data delay detection result of the baseline guarantee task and a task delay constraint of a node used to represent the baseline guarantee task; and selecting a target state from data delay states corresponding to the at least one baseline guarantee task according to a state level of each data delay state corresponding to the baseline guarantee task, and using the target state as the baseline state, wherein a state level of the target state is not lower than a state level of another data delay state other than the target state in the data delay states corresponding to the at least one baseline guarantee task.

10. The method according to claim 8, wherein the at least two real-time tasks comprise a baseline guarantee task and at least one first task, there is a direct or indirect data dependency relationship between the baseline guarantee task and each first task, the task link graph comprises a path corresponding to the baseline guarantee task, the path comprises a node used to represent the baseline guarantee task and a node used to represent each first task, and a start point of the path is the node used to represent the baseline guarantee task, the node parameter comprises a task hierarchy, the delay state characterization data comprises a baseline event, and a trigger process of the baseline event comprises:

determining a target node from nodes in the path other than the start point and in an untraversed state, wherein a task hierarchy of the target node is not higher than a task hierarchy of another node other than the target node in the nodes in the untraversed state;

if a data delay detection result of a task represented by the target node exceeds a task delay constraint of the target node, and it is determined that there is no node that has triggered the baseline event in the path, triggering a baseline event corresponding to the target node; or if the data delay detection result of the task represented by the target node does not exceed the task delay constraint of the target node, updating a traversal description state of the target node to a traversed state, and continuing to perform the operation of determining a target node from nodes in the path other than the start point and in an untraversed state.

11. The method according to claim 10, wherein the triggering a baseline event corresponding to the target node comprises:

if it is determined that there is no baseline event corresponding to the target node, creating the baseline event corresponding to the target node; or if it is determined that there is the baseline event corresponding to the target node, updating a duration parameter of the baseline event corresponding to the target node.

12. The method according to claim 10, further comprising:

if the data delay detection result of the task represented by the target node does not exceed the task delay constraint of the target node, there is the baseline event corresponding to the target node, and an event state of the baseline event corresponding to the target node is a first state value, updating the event state of the baseline event corresponding to the target node from the first state value to a second state value.

13. The method according to claim 1, wherein the node parameter comprises a task delay constraint;
the at least two real-time tasks comprise at least one baseline guarantee task and at least one second task, a task delay constraint of a node used to represent the baseline guarantee task comprises a baseline commitment delay and a baseline early warning delay, for any second task, there is a direct or indirect data dependency relationship between the second task and one or more baseline guarantee tasks; and
the method further comprises:
generating alarm information according to the data delay detection results of the at least two real-time tasks and the task delay constraint of each node in the task link graph, wherein the alarm information comprises one or more of a baseline early warning alarm instance, a baseline breaking alarm instance, and a baseline event alarm instance, data delay detection results of the baseline guarantee tasks described in the baseline early warning alarm instance are all lower than the baseline commitment delay, and the data delay detection results of the baseline guarantee tasks described in the baseline early warning alarm instance all exceed the baseline early warning delay, data delay detection results of the baseline guarantee tasks described in the baseline breaking alarm instance all exceed the baseline commitment delay, and the baseline event alarm instance is generated according to a baseline event triggered by one or more second tasks, and for any second task used to trigger the baseline event, a data delay detection result of the second task exceeds a task delay constraint of a node used to represent the second task.

14. The method according to claim 1, further comprising:
constructing a delay analysis graph according to the task link graph and the data delay detection results of the at least two real-time tasks; and
displaying the delay analysis graph.

15. The method according to claim 1, wherein the method is applied to a client, and
the obtaining a baseline construction parameter comprises:
receiving a baseline construction request, wherein the baseline construction request carries the baseline construction parameter.

16. An electronic device, comprising: a processor and a memory,
wherein the memory is configured to store an instruction or a computer program, and
the processor is configured to execute the instruction or the computer program in the memory, to enable the electronic device to perform a data delay detection method,
wherein the data delay detection method comprises:
obtaining a baseline construction parameter;
constructing a baseline instance according to the baseline construction parameter, wherein the baseline instance comprises a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream;
obtaining a data delay detection result of each real-time task; and determining delay state characterization data of the baseline instance according to data delay detection results of the at least two real-time tasks, wherein
the baseline construction parameter comprises a task identifier of a baseline guarantee task, a baseline commitment delay, a baseline early warning delay, and a task delay gain coefficient, and
the constructing a baseline instance according to the baseline construction parameter comprises:
determining the at least two real-time tasks and the data dependency relationship between the at least two real-time tasks according to a pre-constructed task link relationship and the task identifier of the baseline guarantee task, wherein the task link relationship comprises the data dependency relationship between the at least two real-time tasks, the at least two real-time tasks comprise the baseline guarantee task and a task that directly or indirectly provides data for the baseline guarantee task; and
constructing the baseline instance according to the at least two real-time tasks, the data dependency relationship between the at least two real-time tasks, the baseline commitment delay, the baseline early warning delay, and the task delay gain coefficient.

17. The electronic device according to claim 16, wherein the constructing the baseline instance comprises:
constructing, in the task link graph, a node corresponding to the baseline guarantee task, and determining a node parameter of the node corresponding to the baseline guarantee task according to the baseline commitment delay and the baseline early warning delay;
determining, according to the data dependency relationship between the at least two real-time tasks, an upstream task of a target task from the at least two real-time tasks, wherein an initial value of the target task is the baseline guarantee task, and the data dependency relationship between the at least two real-time tasks comprises a data dependency relationship between the target task and the upstream task;
constructing, in the task link graph, a node corresponding to the upstream task, constructing, in the task link graph, a connection relationship between the node corresponding to the upstream task and the node corresponding to the target task, and determining a node parameter of the node corresponding to the upstream task according to the task delay gain coefficient and the node parameter of the node corresponding to the target task; and
updating a traversal description state of the node corresponding to the target task to a traversed state, updating the target task with a task corresponding to a node in an untraversed state in the task link graph, and continuing to perform the operation of determining, according to the data dependency relationship between the at least two real-time tasks, an upstream task of a target task from the at least two real-time tasks, until all nodes in the task link graph are in the traversed state.

18. A non-transitory computer-readable medium, wherein an instruction or a computer program is stored in the computer-readable medium, and when the instruction or the computer program runs on a device, the device is enabled to perform a data delay detection method,
wherein the data delay detection method comprises:
obtaining a baseline construction parameter;
constructing a baseline instance according to the baseline construction parameter, wherein the baseline instance comprises a task link graph and a node parameter of each node in the task link graph, the task link graph is used to describe a data dependency relationship between at least two real-time tasks, different nodes in the task link graph are used to represent different real-time tasks, and the at least two real-time tasks are used to process a real-time data stream;

obtaining a data delay detection result of each real-time task; and determining delay state characterization data of the baseline instance according to data delay detection results of the at least two real-time tasks, wherein the baseline construction parameter comprises a task identifier of a baseline guarantee task, a baseline commitment delay, a baseline early warning delay, and a task delay gain coefficient, and the constructing a baseline instance according to the baseline construction parameter comprises:

determining the at least two real-time tasks and the data dependency relationship between the at least two real-time tasks according to a pre-constructed task link relationship and the task identifier of the baseline guarantee task, wherein the task link relationship comprises the data dependency relationship between the at least two real-time tasks, the at least two real-time tasks comprise the baseline guarantee task and a task that directly or indirectly provides data for the baseline guarantee task; and constructing the baseline instance according to the at least two real-time tasks, the data dependency relationship between the at least two real-time tasks, the baseline commitment delay, the baseline early warning delay, and the task delay gain coefficient.

* * * * *